United States Patent
Tanabe

(10) Patent No.: US 10,046,610 B2
(45) Date of Patent: Aug. 14, 2018

(54) TIRE ANTI-SLIP DEVICE

(71) Applicant: CAR MATE MFG. CO., LTD., Tokyo (JP)

(72) Inventor: Shigeru Tanabe, Tokyo (JP)

(73) Assignee: CAR MATE MFG. CO., LTD., Tokyo (JP)

( * ) Notice: Subject to any disclaimer, the term of this patent is extended or adjusted under 35 U.S.C. 154(b) by 117 days.

(21) Appl. No.: 15/103,481

(22) PCT Filed: Oct. 23, 2014

(86) PCT No.: PCT/JP2014/005398
§ 371 (c)(1),
(2) Date: Jun. 10, 2016

(87) PCT Pub. No.: WO2015/087478
PCT Pub. Date: Jun. 18, 2015

(65) Prior Publication Data
US 2016/0311277 A1    Oct. 27, 2016

(30) Foreign Application Priority Data
Dec. 11, 2013    (JP) .................................. 2013-255653

(51) Int. Cl.
*B60C 27/06* (2006.01)
*B60C 27/20* (2006.01)
*B60C 27/10* (2006.01)

(52) U.S. Cl.
CPC ............ *B60C 27/066* (2013.01); *B60C 27/06* (2013.01); *B60C 27/10* (2013.01); *B60C 27/20* (2013.01)

(58) Field of Classification Search
CPC ... B60C 27/066; B60C 27/10; B60C 27/2706; B60C 27/20
(Continued)

(56) References Cited

U.S. PATENT DOCUMENTS

| | | | | |
|---|---|---|---|---|
| 187,142 | A | * | 8/1932 | Olmstead |
| 1,932,576 | A | * | 10/1933 | Dodge ................... B60C 27/16 152/221 |
| 2,671,489 | A | * | 3/1954 | Henderson ............. B60C 27/10 152/229 |

(Continued)

FOREIGN PATENT DOCUMENTS

| DE | 3825748 A1 | 2/1990 |
|---|---|---|
| EP | 0352873 A2 | 1/1990 |

(Continued)

OTHER PUBLICATIONS

Jan. 20, 2015 International Search Report issued in International Patent Application No. PCT/JP2014/005398.
(Continued)

*Primary Examiner* — S. Joseph Morano
*Assistant Examiner* — Jean W Charleston
(74) *Attorney, Agent, or Firm* — Oliff PLC

(57) ABSTRACT

To obtain a tire anti-slip device including an anti-slip body having a tread portion making contact with the ground, inner and outer link portions formed to protrude respectively from the tread portion to the tire inner and outer sides, and a tightener configured to tightly fit the body to the tire, and can prevent removal of the body from the tire inner or outer side direction in the tightener operation so that the tire anti-slip device can be mounted to a tire optimum position with a simple manipulation, a wire guide portion capable of guiding the tightening wire in the body width direction is formed in a position of one end portion of the body, and one end position (of the wire guide member) and the other end position of the body approach each other in both positions of the inner and outer link portions by tightening the tightening wire.

40 Claims, 27 Drawing Sheets

(58) Field of Classification Search
USPC ............ 152/213 A, 217, 218, 219, 221, 222, 152/225 R, 214, 233, 234
See application file for complete search history.

(56) References Cited

U.S. PATENT DOCUMENTS

| | | | | |
|---|---|---|---|---|
| 3,092,163 | A | * | 6/1963 | Bunker, Jr. ............. B60C 27/16 152/221 |
| 3,770,039 | A | * | 11/1973 | Pfoertner ................ B60C 27/16 152/221 |
| 4,280,544 | A | * | 7/1981 | White .................... B60C 27/16 152/179 |
| 4,390,053 | A | * | 6/1983 | Rieger ................... B60C 27/10 152/213 A |
| 4,862,937 | A | | 9/1989 | Nakajima |

FOREIGN PATENT DOCUMENTS

| | | |
|---|---|---|
| JP | H03-266710 A | 11/1991 |
| JP | H04-238704 A | 8/1992 |
| JP | H04-125906 U | 11/1992 |
| JP | 2001-071728 A | 3/2001 |

OTHER PUBLICATIONS

Jul. 4, 2017 Extended European Search Report issued in European Patent Application No. 14869754.3.
Mar. 7, 2017 Office Action issued in Chinese Patent Application No. 201480067606.5.
Aug. 22, 2017 Office Action issued in Chinese Patent Application No. 201480067606.5.

\* cited by examiner

TIRE ANTI-SLIP DEVICE

TECHNICAL FIELD

The present invention relates to a tire anti-slip device mounted to a tire of a vehicle in the event of a snowfall and the like, and more particularly, to a tire anti-slip device having an anti-slip body formed of a non-metal material such as rubber or plastic.

BACKGROUND ART

A tire anti-slip device of the prior art is discussed in Japanese Laid-open Patent Publication No. 2001-71728, in which the tire anti-slip device includes a net-type tire anti-slip body 601, connectors 602a and 602b configured to connect both ends of the tire anti-slip body 601 to each other in the inner side position of the tire, connectors 603a and 603b configured to connect both ends of the anti-slip body 601 to each other in the outer side position of the tire as illustrated in FIG. 43. In the anti-slip device described above, a clamp lock mechanism 604 is provided in the anti-slip body 601 in the outer side position of the tire in order to reduce a distance between both ends and tightly fit the anti-slip device to the tire.

However, in the aforementioned tire anti-slip device of the prior art, when it is mounted to the tire, the connectors 602a, 602b, 603a, and 603b used to connect both ends of the tire anti-slip body are provided in both the inner and outer side positions of the tire. In particular, it is difficult to perform a work for connecting the connectors 602a and 602b in the inner side position of the tire, where an arm insertion gap is small, and dirt such as mud is easily adhered. In addition, this work may make user's clothes dirty disadvantageously.

In order to address such problems, a tire anti-slip device is discussed in Japanese Laid-open Patent Publication No. 04-238704, in which, as illustrated in FIG. 44, the tire anti-slip device has an anti-slip body 701 disposed to make contact with a tire along an outer circumference of the tire, holding members 702 provided in inner end portions of the anti-slip body 701 in the tire width direction with a predetermined interval, latching members 703 provided in outer end portions of the anti-slip body 701 in the tire width direction with a predetermined interval, a strap-like tensioning member 704 configured to connect the holding members 702 to each other with a variable interval and guided to a lateral side of the latching member through a hollow portion 705 provided inside the anti-slip body in the tire width direction, and an elastic member 706 such as rubber or a spring provided in an end portion of the tensioning member 704, so that the holding members 702 positioned in the inner side of the tire are fastened by drawing both ends of the tensioning member 704 from the outer side of the tire.

Since a work for mounting the tire anti-slip device to the inner side of the tire can be performed in the outer side of the tire, it is possible to simplify the mounting work and reduce the time required to mount the tire anti-slip device. In addition, since hooking in the inner side of the tire is not necessary, it is possible to prevent user's clothes from being dirty. Furthermore, since the inner side of the tire is fastened using the strap-like tensioning member 704 having no elasticity, it is possible to improve an abutting force to the outer circumference of the tire. Moreover, it is possible to prevent lost components through integration of components.

However, in the technique discussed in Japanese Laid-open Patent Publication No. 04-238704, a position for attracting one end portion and the other end portion of the anti-slip body 701 in the longitudinal direction by drawing both ends of the tensioning member 704 is placed only in a part of the holding members 702 disposed in the inner side of the tire. Therefore, when one end portion 701a and the other end portion 701b of the anti-slip body 701 are attracted to each other by drawing both ends of the tensioning member 704, the anti-slip body 701 is attracted toward the inner side of the tire. Therefore, it is necessary to reduce a distance between the one end portion 701a and the other end portion 702b in the outer side of the tire by drawing both ends of the tensioning member 704, hooking, to each latching member 703, a part of the tensioning member 704 extracted to the outer side of the tire, hooking an elastic member 706 such as rubber or a spring provided in the end portion to an arbitrary position of the latching member 703, and moving the anti-slip body 701, that has been attracted to the inner side of the tire, to the outer side of the tire.

Since the hollow portion 705 perforated in the tire width direction and used to extract the tensioning member 704 to the lateral side of the latching member 703 is formed far from the longitudinal positions of the one end portion 701a and the other end portion 701b of the anti-slip body 701, the attracting force between the one end portion 701a and the other end portion 701b of the anti-slip body 701 in the longitudinal direction may be weakened due to a frictional resistance between the holding members 702 and the tensioning member 704 of the anti-slip body 701 provided in the inner end portion of the tire in the tire width direction with a predetermined interval when both ends of the tensioning member 704 are drawn.

In another technique of the prior art discussed in Japanese Laid-open Patent Publication No. 04-125906, a tire anti-slip device is configured such that both ends of a rim 802 penetrating through edges (in the tire inner side) of a plurality of anti-slip pieces 801 are guided by a guide piece 804 as extracting portions 803 from a rear side to a front side of the tire as illustrated in FIG. 45. Each of the extracting portions 803 in both ends of the rim 802 is guided from the left and right directions to a generally T-shaped portion formed in one end of the guide piece 804 (in the inner side of the tire), passes through the guide piece 804, and is guided to the outer side of the tire through a roller 805. In this technique of the prior art, when the extracting portions 803 in both ends of the rim 802 passing through the guide piece 804 are guided to the front side of the tire, the frictional resistance with the rim 802 can be reduced using the roller 805. However, a portion of the generally T-shaped portion formed in one end of the guide piece 804 (in the inner side of the tire) to receive the rim 802 is a horizontal hole formed in an end portion of the inner space of the guide piece 804. Therefore, this structure is not suitable for sufficiently reducing the frictional resistance. Furthermore, this tire anti-slip device does not have a structure corresponding to the one end portion and the other end portion of the anti-slip body in the longitudinal direction, and it is necessary to tension each of a pair of left and right extracting portions 803a and 803b oppositely to the guide piece 804 when the rim 802 is tightened by drawing the extracting portions 803 in both ends of the rim 802.

CITATION LIST

Patent Documents

Patent Document 1: Japanese Laid-open Patent Publication No. 2001-71728
Patent Document 2: Japanese Laid-open Patent Publication No. 04-238704
Patent Document 3: Japanese Laid-open Utility Model Publication No. 04-125906

SUMMARY OF INVENTION

Technical Problem

In view of the aforementioned problems, it is therefore an object of the present invention to obtain a tire anti-slip device having an anti-slip body shaped in a set of belts and mounted to a tire along a circumferential direction, the anti-slip body having a tread portion provided with a ground portion making contact with the ground on its surface, a plurality of inner link portions formed to protrude from the tread portion to the inner side of the tire in the width direction, and a plurality of outer link portions formed to protrude from the tread portion to the outer side of the tire in the width direction, and a tightener configured to tightly fit the anti-slip body to the tire, wherein the tightener can be controlled in the outer side of the tire, the anti-slip body is not easily removed from the inner or outer side direction of the tire during a work for tightly fitting the tire anti-slip device to the tire, and the tire anti-slip device can be mounted to an optimum position of the tire with a simple manipulation.

Solution to Problem

According to an aspect of the invention, there is provided a tire anti-slip device including: an anti-slip body shaped in at least a set of belts and mounted along a tire circumferential direction, the anti-slip body having a tread portion provided with a ground portion making contact with the ground on its surface, a plurality of inner link portions formed to protrude from the tread portion to an inner side of a tire in a width direction, and a plurality of outer link portions formed to protrude from the tread portion to an outer side of the tire in the width direction; and a tightener for tightening at least a tightening wire to tightly fit the anti-slip body to the tire, wherein the tightener of the anti-slip device has a wire guide member provided with a wire guide portion capable of guiding the tightening wire to the width direction of the tire, so that one side face of the wire guide member in the tire circumferential direction is maintained to be close to an end of the anti-slip body, or one side position of the wire guide member of the tire circumferential direction is formed integrally with the anti-slip body, the wire guide member has a tread portion provided with a ground portion making contact with the ground on its surface, the inner link portion formed to protrude from the tread portion to the inner side of the tire in the width direction, and the outer link portion formed to protrude from the tread portion to the outer side of the tire in the width direction, the wire guide portion has wire access holes positioned in each of the inner and outer link portions, a facing end portion of the anti-slip body is arranged to face the other side face of the wire guide member when the anti-slip device is mounted to the tire, and both of a distance between the inner link portion of the wire guide member and inner link portion positioned in the facing end portion of the anti-slip body and a distance between the outer link portion of the wire guide member and the outer link portion positioned in the facing end portion of the anti-slip body are reduced in a tightening operation of the tightener.

In the tire anti-slip device described above, the wire guide portion may be provided with curved portions directed toward the other side face of the wire guide member in positions of the inner and outer link portions, so that the wire access holes of the wire guide portion are directed to the other side face of the wire guide member.

In the tire anti-slip device described above, the inner link portion of the anti-slip body or a wire guide member may be provided with a tightening wire end fixing portion for fixing an end of the tightening wire, and the tightener may be configured such that the tightening wire having the end fixed to the tightening wire end fixing portion passes through tightening wire holders arranged in the inner link portions and is extracted from the tightening wire holder disposed in the inner link portion positioned in the facing end portion of the anti-slip body, further, the tightening wire passes through the wire guide portion by way of the wire access hole provided in the inner link portion of the wire guide member, and is extracted from the wire access hole of the outer link portion, and the tightening wire is connected to a wire winding mechanism disposed in a position of the outer link portion of the anti-slip body or the wire guide member.

In the tire anti-slip device described above, the tightening wire may be held by the tightening wire holders arranged in each of the inner link portions, and a distance between the plurality of inner link portions may be reduced by extracting the tightening wire arranged across the plurality of inner link portions using the tightener.

In the tire anti-slip device described above, a return stopper member for restricting movement of the tightening wire in a return direction to the inner side of the inner link portion of the anti-slip body may be fixed to the tightening wire between the inner link portion of the wire guide member and the facing end portion of the inner link portion of the anti-slip body.

In the tire anti-slip device described above, tubular members may be arranged between the tightening wire holders formed in each of the inner link portions of the anti-slip body, and a minimum distance between the tightening wire holders provided in each of the inner link portions may be restricted as the tightening wire passes through the tubular members.

In the tire anti-slip device described above, a tightening wire end fixing portion configured to fix an end of the tightening wire may be formed in the inner link portion positioned in the facing end portion of the anti-slip body, and the tightener may be configured such that the tightening wire having the end fixed to the tightening wire end fixing portion passes through the wire guide portion by way of the wire access hole provided in the inner link portion of the wire guide member, is extracted from the wire access hole of the outer link portion, and is connected to the wire winding mechanism arranged in a position of the outer link portion of the anti-slip body or a wire guide member.

In the tire anti-slip device described above, an inner distance restricting wire holder configured to hold an inner distance restricting wire may be arranged in at least a part of the inner link portions of the anti-slip body, and the inner distance restricting wire may be held by the inner distance restricting wire holders arranged in each of the inner link portions.

The tire anti-slip device described above, tubular members may be arranged between the inner distance restricting wire holders formed in the inner link portions of the anti-slip body, and a minimum distance between the inner distance restricting wire holders of each of the inner link portions may be restricted as the inner distance restricting wire passes through the tubular members.

In the tire anti-slip device described above, a ring member connecting hole where an inner distance restricting ring member can be connected may be formed between the inner link portion of the wire guide member and/or at least a part of the inner link portions of the anti-slip body, and a distance between each of the inner link portions may be restricted as the inner distance restricting ring member is connected to the ring member connecting hole.

In the tire anti-slip device described above, the wire winding mechanism may be disposed between the outer link portions in any position of the outer link portions of the anti-slip body or the outer link portion of a wire guide member.

In the tire anti-slip device described above, the wire winding mechanism may be disposed between the outer link portion positioned in the facing end portion of the anti-slip body and the outer link portion neighboring to the position of the facing end portion of the anti-slip body.

In the tire anti-slip device described above, the wire winding mechanism may be disposed between the outer link portion positioned in the one end portion of the anti-slip body and the outer link portion neighboring to the position of the one end portion of the anti-slip body.

In the tire anti-slip device described above, a connecting member may be fixed to a backside of the wire winding mechanism, and at least one end of the connecting member may be fixed to the neighboring outer link portion.

In the tire anti-slip device described above, the tightening wire holder may be arranged in at least one of the outer link portions of the anti-slip body between the wire access hole formed in the outer link portion of the wire guide member and the wire winding mechanism.

In the tire anti-slip device described above, an outer distance restricting wire holder configured to hold an outer distance restricting wire may be arranged in at least a part of the outer link portions of the anti-slip body, and the outer distance restricting wire may be held by the outer distance restricting wire holders arranged in each of the outer link portions.

In the tire anti-slip device described above, one end of the outer distance restricting wire may be fixed to the outer link portion of the wire guide member.

In the tire anti-slip device described above, the other end of the outer distance restricting wire may be fixed to the outer link portion where one end or the other end of the connecting member of the wire winding mechanism is fixed.

In the tire anti-slip device described above, the other end of the outer distance restricting wire may be fixed to the connecting member of the wire winding mechanism.

In the tire anti-slip device described above, tubular members may be arranged in at least a part of spaces between the outer distance restricting wire holders arranged in the outer link portions of the anti-slip body, and a minimum distance between the outer distance restricting wire holders of each of the outer link portions may be restricted as the outer distance restricting wire passes through the tubular members.

In the tire anti-slip device described above, a ring member connecting hole where an outer distance restricting ring member can be connected may be formed between the outer link portion of the wire guide member and/or at least a part of the outer link portions of the anti-slip body, and a distance between each of the outer link portions may be restricted by connecting the outer distance restricting ring member to the ring member connecting hole.

In the tire anti-slip device described above, the anti-slip body may include a first anti-slip body and a second anti-slip body, one end portion of the first anti-slip body in the tire circumferential direction may be provided with a first wire guide member, the other end portion of the first anti-slip body in the tire circumferential direction may be provided with a second wire guide member, one side face of the first wire guide member and one side face of the second wire guide member may be maintained to be close to an end of the first anti-slip body at all time, or one side position of the first wire guide member and one side position of the second wire guide member are formed integrally with the first anti-slip body, one of the facing end portions and the other facing end portion of the second anti-slip body may be arranged in positions of the first anti-slip body facing the other side face of the first wire guide member and the other side face of the second wire guide member, respectively, when the anti-slip device is mounted to the tire, at least one of a distance between the other side face of the first wire guide member of the first anti-slip body and the one facing end portion of the second anti-slip body and a distance between the other facing end portions s of the second anti-slip body arranged to face the other side face of the second wire guide member of the first anti-slip body may be variable, each of the inner link portions of the second anti-slip body may be provided with the tightening wire holder, and the tightener may be configured such that the tightening wire passes through the tightening wire holders arranged in the inner link portions of the second anti-slip body, one end of the tightening wire is extracted from the tightening wire holder disposed in the inner link portion of the one facing end portion of the second anti-slip body, enters the wire access hole of the inner link portion of the first wire guide member of the first anti-slip body, is extracted from the wire access hole of the outer link portion through the wire guide portion, passes through the inside of the tightening wire holder disposed in an outer end portion positioned in one of the facing end portions of the second anti-slip body arranged to face, and is connected to the first wire winding mechanism arranged in a position of the outer link portion of the second anti-slip body, and the other end of the tightening wire is extracted from the tightening wire holder disposed in the inner link portion of the other facing end portion of the second anti-slip body, enters the wire access hole of the inner link portion of the second wire guide member of the first anti-slip body, is extracted from the wire access hole of the outer link portion, passes through the inside of the tightening wire holder disposed in the outer end portion positioned in the other facing end portion of the second anti-slip body arranged to face, and is connected to the second wire winding mechanism arranged in a position of the outer link portion of the second anti-slip body.

In the tire anti-slip device described above, tubular members may be arranged in at least a part of spaces between the tightening wire holders arranged in the inner link portions of the second anti-slip body, and a minimum distance between the tightening wire holders of each of the inner link portions may be restricted as the tightening wire passes through the tubular members.

In the tire anti-slip device described above, an inner distance restricting wire end fixing portion configured to fix an end of the inner distance restricting wire may be formed in each of the inner link portions of the first and second wire guide members, each of the inner link portions of the first anti-slip body may be provided with an inner distance restricting wire holder configured to hold the inner distance restricting wire, and the inner distance restricting wire may be held by the inner distance restricting wire holders formed in each of the inner link portions of the first anti-slip body.

In the tire anti-slip device described above, tubular members may be arranged in at least a part of spaces between the inner distance restricting wire holders arranged in the inner link portions of the first anti-slip body, and a minimum distance between the inner distance restricting wire holders of each of the inner link portions may be restricted as the inner distance restricting wire passes through the tubular members.

In the tire anti-slip device described above, a ring member connecting hole where an inner distance restricting ring member can be connected may be formed between the inner link portion of the first wire guide member, and/or the inner link portion of the second wire guide member, and/or at least a part of the inner link portions of the first anti-slip body, and a distance between the first wire guide member, and/or the second wire guide member, and/or at least a part of the inner link portions of the first anti-slip body may be restricted as the inner distance restricting ring member is connected to the ring member connecting hole.

In the tire anti-slip device described above, each of the outer link portions of the first and second wire guide members may be provided with a first outer distance restricting wire end fixing portion configured to fix an end of the first outer distance restricting wire, each of the outer link portions of the first anti-slip body may be provided with a first outer distance restricting wire holder configured to hold the first outer distance restricting wire, and the first outer distance restricting wire may be held by the first outer distance restricting wire holders arranged in each of the outer link portions.

In the tire anti-slip device described above, tubular members may be arranged in at least a part of spaces between the first outer distance restricting wire holders arranged in the outer link portions of the first anti-slip body, and a minimum distance between the first outer distance restricting wire holders of each of the outer link portions may be restricted as the first outer distance restricting wire passes through the tubular members.

In the tire anti-slip device described above, a ring member connecting hole where a first outer distance restricting ring member can be connected may be formed between the outer link portion of the first wire guide member, and/or the outer link portion of the second wire guide member, and/or at least a part of the outer link portions of the first anti-slip body, and a distance between the first wire guide member, and/or the second wire guide member, and/or at least a part of the outer link portions of the first anti-slip body may be restricted as the first outer distance restricting ring member is connected to the ring member connecting hole.

In the tire anti-slip device described above, at least a part of the outer link portions of the second anti-slip body may be provided with second outer distance restricting wire holders configured to hold the second outer distance restricting wire, and the second outer distance restricting wire may be held by the second outer distance restricting wire holder arranged in each of the outer link portions.

In the tire anti-slip device described above, one end of the second outer distance restricting wire may be fixed to a connecting member of the first wire winding mechanism, and the other end of the second outer distance restricting wire may be fixed to a connecting member of the second wire winding mechanism.

In the tire anti-slip device described above, one end of the second outer distance restricting wire may be fixed to the outer link portion where the connecting member of the first wire winding mechanism is fixed, and the other end of the second outer distance restricting wire may be fixed to the outer link portion where the connecting member of the second wire winding mechanism is fixed.

In the tire anti-slip device described above, tubular members may be arranged in at least a part of spaces between the second outer distance restricting wire holders arranged in the outer link portions of the second anti-slip body, and a minimum distance between the second outer distance restricting wire holders of each of the outer link portions may be restricted as the second outer distance restricting wire passes through the tubular members.

In the tire anti-slip device described above, a ring member connecting hole where a second outer distance restricting ring member can be connected may be formed between at least a part of the outer link portions of the second anti-slip body, and a distance between each of the outer link portions of the second anti-slip body may be restricted as the second outer distance restricting ring member is connected to the ring member connecting hole.

In the tire anti-slip device described above, the wire guide portion may be a hole provided in the wire guide member.

In the tire anti-slip device described above, the hole provided in the wire guide member may be formed by a tubular wire holding member insert-molded to the wire guide member.

In the tire anti-slip device described above, the hole provided in the wire guide member may be formed by a concave portion formed in the wire guide member and a tubular wire holding member arranged inside the concave portion.

In the tire anti-slip device described above, the wire guide portion may have a concave portion formed in the wire guide member, and a latch portion capable of at least partially blocking the concave portion to prevent removal of the wire.

In the tire anti-slip device described above, the wire guide member (2) may be formed only by a tubular wire guide portion (21).

In the tire anti-slip device described above, assuming that a diameter of the tightening wire is set to "A mm," a radius of curvature of the curved portion formed in each of the wire guide portions may be set to "3 $A^2$ mm" or larger.

In the tire anti-slip device according to the present invention, the wire guide member provided with the wire guide portion where the tightening wire passes toward the width direction of the anti-slip body is arranged in the one end position of the anti-slip body, and the wire guide portion is provided with wire access holes in positions of the inner and outer link portions. In addition, when the tightening wire is tightened by manipulating a handler of the tightener arranged in a position of the outer link portion, the one end position of the anti-slip body (the wire guide member) and the other end position are attracted to each other in both positions of the inner and outer link portions. Therefore, the anti-slip body is not easily removed from the inner or outer side direction of the tire during a work for tightly fitting the tire anti-slip device to the tire, and the tire anti-slip device can be mounted to an optimum position of the tire with a simple manipulation.

The wire access hole of the wire guide portion is formed in each position of the inner and outer link portions of the wire guide member, and the wire guide portion is provided with curved portions directed to the other end portion of the tire anti-slip body in positions of the inner and outer link portions. Since each of the wire access holes is directed toward the other end portion of the anti-slip body, a frictional resistance between the tightening wire and the wire guide portion during the operation of the tightener is reduced. In addition, since the wire guide member provided with the wire guide portion where the tightening wire is inserted in the operation for tightly fitting the tire anti-slip device to the tire is directly drawn to the other end portion of the anti-slip body, it is possible to prevent the tightening force of the tightening wire from being absorbed by deformation or friction of the tire anti-slip device and minimize the absorption. Therefore, it is possible to effectively perform the mounting and tightening operation of the tire anti-slip device fitted to the tire.

DESCRIPTION OF EMBODIMENTS

Embodiments of the present invention will now be described in detail with reference to the accompanying drawings.

Embodiment 1

Figure 1:
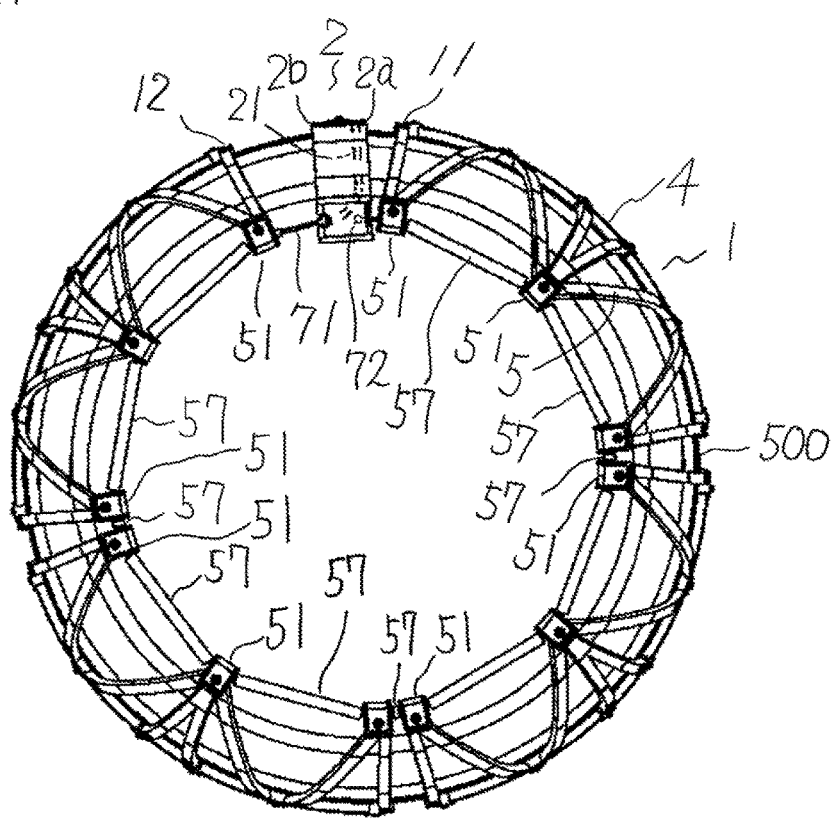
FIG. 1 is a rear view illustrating a mount state of an anti-slip device according to a first embodiment of the invention as seen from an inner side of a tire.
Figure 2:
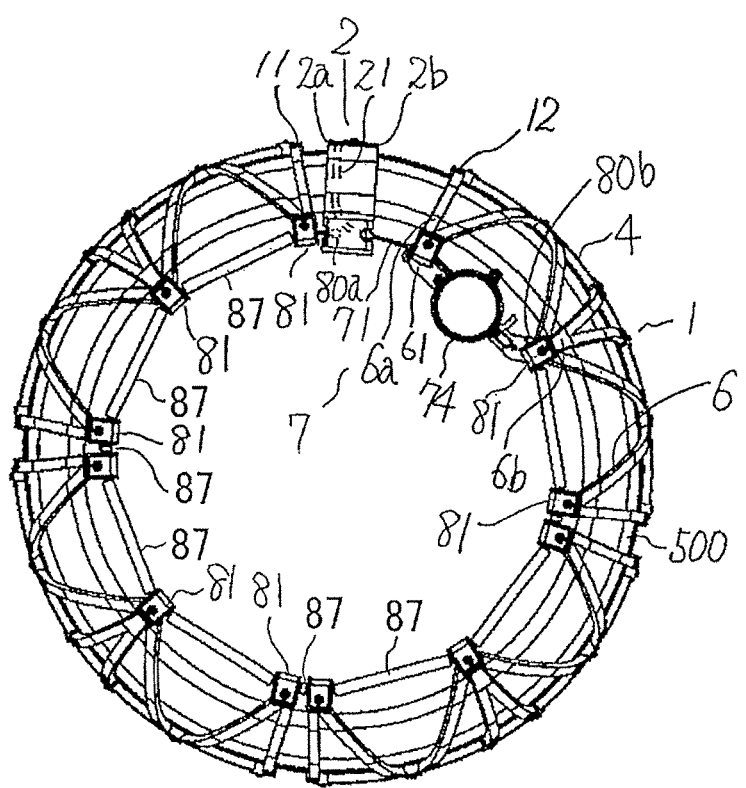
FIG. 2 is a front view illustrating a mount state of the anti-slip device according to the first embodiment of the invention as seen from an outer side of the tire.
Figure 3:
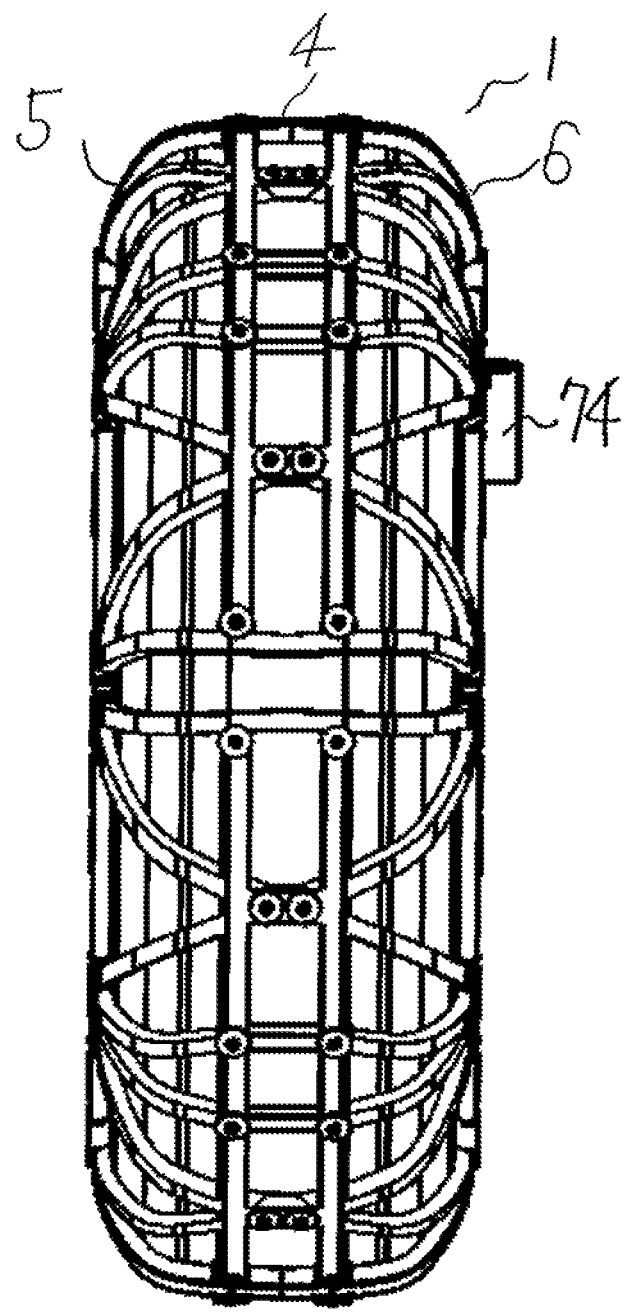
FIG. 3 is a left side view illustrating a mount state of the anti-slip device according to the first embodiment of the invention as seen from the left side of the tire.
Figure 4:
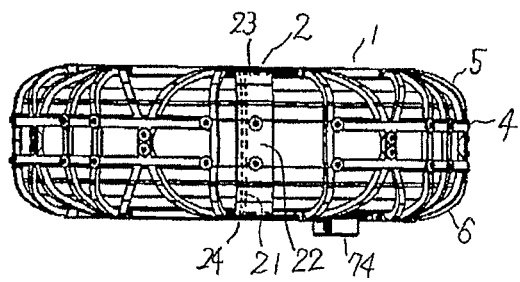
FIG. 4 is a top plan view illustrating a mount state of the anti-slip device according to the first embodiment of the invention as seen from the upper side of the tire.
Figure 5:
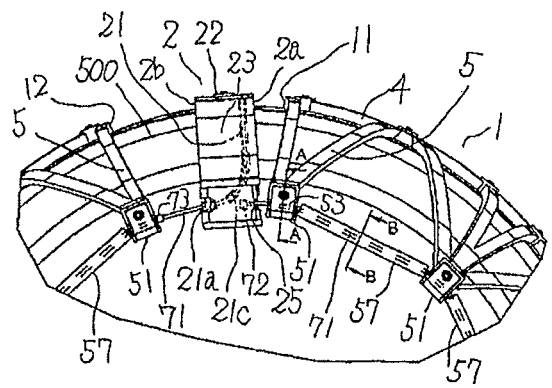
FIG. 5 is an enlarged view illustrating main parts of FIG. 1.
Figure 6:
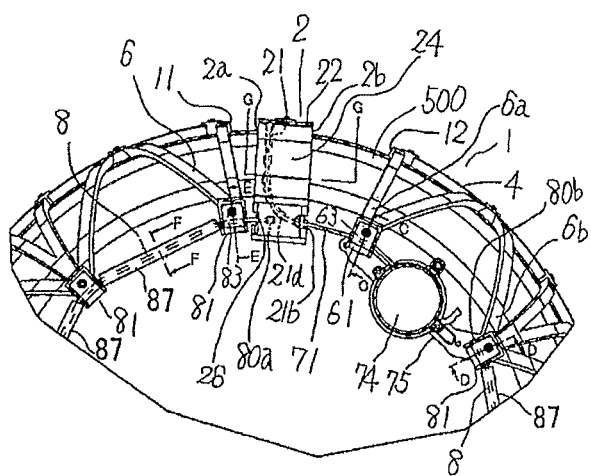
FIG. 6 is an enlarged view illustrating main parts of FIG. 2.

FIGS. 1 to 13 illustrate an anti-slip device according to an exemplary embodiment of the invention. FIG. 1 is a rear view illustrating a mount state of the anti-slip device according to a first embodiment of the invention as seen from an inner side of a tire. FIG. 2 is a front view illustrating a mount state of the anti-slip device according to the first embodiment of the invention as seen from an outer side of the tire. FIG. 3 is a left side view illustrating a mount state of the anti-slip device according to the first embodiment of the invention as seen from a left side of the tire. FIG. 4 is a top plan view illustrating a mount state of the anti-slip device according to the first embodiment of the invention as seen from an upper side of the tire. FIG. 5 is an enlarged view illustrating main parts of FIG. 1. FIG. 6 is an enlarged view illustrating main parts of FIG. 2.

The tire anti-slip device according to the first embodiment of the invention has an anti-slip body 1 shaped in a set of belts and mounted to a tire 500 of a vehicle along a circumferential direction. The anti-slip body 1 has a tread portion 4 formed of a flexible material such as polyurethane elastomer or rubber and provided with a ground portion making contact with the ground on its surface, a plurality of inner link portions 5 formed to protrude from the tread portion 4 to the inner side of the tire 500 in a width direction, a plurality of outer link portions 6 formed to protrude from the tread portion 4 to the outer side of the tire 500 in the width direction, and a tightener 7 for tightening a tightening wire 71 to tightly fit the anti-slip body 1 to the tire 500.

The tightener 7 of the anti-slip device has a wire guide member 2 provided with a wire guide portion 21 capable of guiding the tightening wire 71 to the width direction of the tire 500. The wire guide member 2 is configured to maintain its one side face 2a with respect to the circumferential direction of the tire to be close to one end portion 11 of the anti-slip body 1 at all times. Note that one side position of the wire guide member 2 may also be integrated with the anti-slip body 1 (not shown).

The wire guide member 2 includes a tread portion 22 provided with a ground portion making contact with the ground on its surface, an inner link portion 23 formed to protrude from the tread portion 22 to the inner side of the tire in the width direction, and the outer link portion 24 formed to protrude from the tread portion 22 to the outer side of the tire in the width direction. The wire guide portion 21 has wire access holes 21a and 21b provided in positions of the inner link portion 23 and the outer link portion 24, respectively.

When the anti-slip device is mounted to the tire 500, a facing end portion 12 of the anti-slip body 1 is arranged to face the other side face 2b of the wire guide member 2. In addition, the anti-slip body is configured such that a distance between the inner link portion 23 of the wire guide member 2 and the inner link portion 5 of the anti-slip body 1 positioned in the facing end portion 12 and a distance between the outer link portion 24 of the wire guide member 2 and the outer link portion 6a positioned in the facing end portion 12 of the anti-slip body 1 are reduced at the same time when tightening using the tightener 7.

In the wire guide portion 21, curved portions 21c and 21d directed to the other side face 2b of the wire guide member 2 are formed in positions of the inner link portion 23 and the outer link portion 24, respectively. Therefore, the wire access holes 21a and 21b of the wire guide portion 21 are directed toward the other side face 2b of the wire guide member 2 (directed to the other end portion 12 of the anti-slip body 1 when the anti-slip device is mounted to the tire 500).

Note that, if the directions of the wire access holes 21a and 21b directed to the facing end portion 12 are set within a range of 0° (equal to the circumferential direction) to 45° inclined to a tire radial direction with respect to a tire circumferential direction while the anti-slip body 1 is mounted to the tire 500, it is possible to prevent a frictional resistance of the tightening wire 71 accessing the wire access holes 21a and 21b from excessively increasing.

The inner link portion 23 of the wire guide member 2 is provided with a tightening wire end fixing portion 25 that can fix a position of the end portion of the tightening wire 71 not to be easily removed from the inner link portion 23 by holding a large diameter portion 72 formed in the end portion of the tightening wire 71. The tightening wire 71 having the end portion fixed to the inner link portion 23 of the wire guide member 2 sequentially passes through tightening wire holders 51 arranged in the neighboring inner link portions 5 of the anti-slip body 1. The tightening wire 71 passing through the tightening wire holders 51 provided in all of the inner end portions 5 is extracted from the tightening wire holder 51 of the inner link portion 5 positioned in the facing end portion 12 of the anti-slip device body 1.

Further, the tightening wire 71 passes through the wire guide portion 21 by way of the wire access hole 21a provided in the inner link portion 23 of the wire guide member 2 and is extracted from the wire access hole 21b of the outer link portion 24. Then, the tightening wire 71 is connected to a wire winding mechanism 74 disposed between the outer link portion 6a positioned in the facing end portion 12 of the anti-slip body 1 and the outer link portion 6b neighboring to the position of the facing end portion 12. As a result, a tightener can be obtained.

Figure 7:
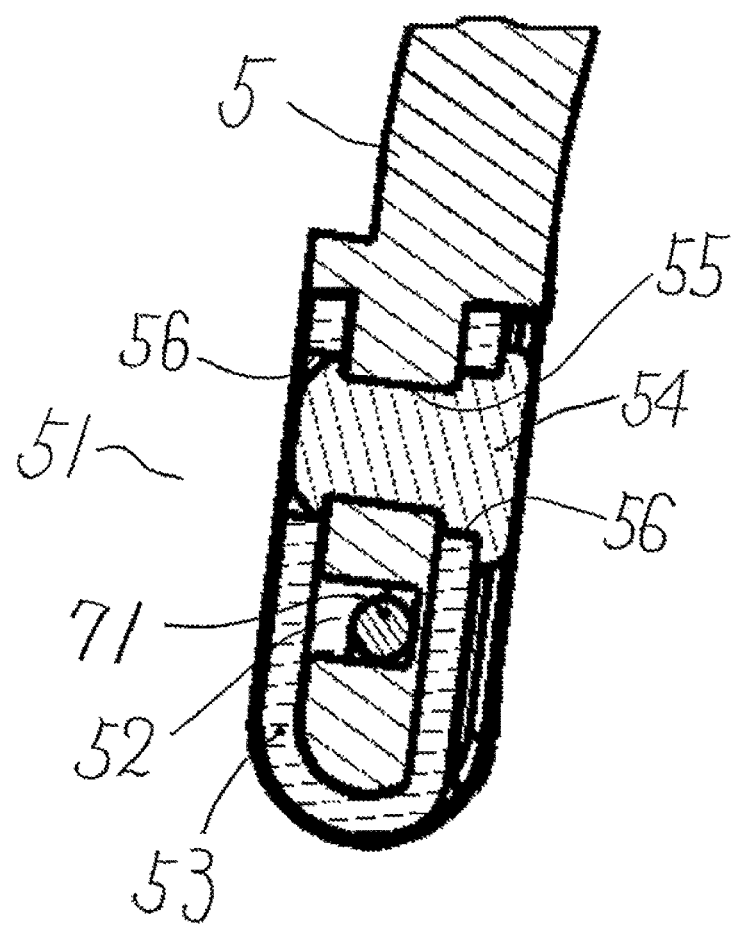
FIG. 7 is an enlarged view illustrating a cross-section taken along the line A-A of FIG. 1.

The tightening wire holder 51 arranged in the inner link portion 5 of the anti-slip body 1 is disposed in the same circumferential position as that of the inner link portion 5 when the anti-slip device is mounted to tire. As illustrated in FIG. 7, the tightening wire holder 51 includes a concave portion 52 provided with an internal space larger than a diameter of the tightening wire 71 formed in the inner link portion 5, a U-shaped cover member 53 arranged to cover the concave portion 52, and a pin-shaped member 54 used to fix the cover member 53 to the inner link portion 5. By fixing a hole 55 formed in the inner link portion 5 and holes 56 formed in both ends of the cover member 53 using the pin-shaped member 54, the cover member 53 is connected to the inner link portion 5 not to be easily removed. Note that, as the pin-shaped member 54, a pin-shaped fixture known in the art, such as a grommet (eyelet), a rivet, and a bolt/nut set may be employed. The distance between the plurality of inner link portions 5 is reduced by extracting the tightening wire 71 disposed between the plurality of tightening wire holders 51 using the tightener 7. Note that the tightening wire 71 may be fixed (nipped) to at least a part of the tightening wire holders 51 formed in each inner link portion 5.

A return stopper member 73 is fixed to the tightening wire 71 between the inner link portion 5 formed in a position of the facing end portion 12 of the anti-slip body 1 and the wire access hole 21a formed in the inner link portion 23 of the wire guide member 2 when the anti-slip device is mounted to the tire 500. As a result, a movement amount of the tightening wire 71 toward the plurality of tightening wire holders 51 is restricted when the tightener 7 is released.

Figure 8:
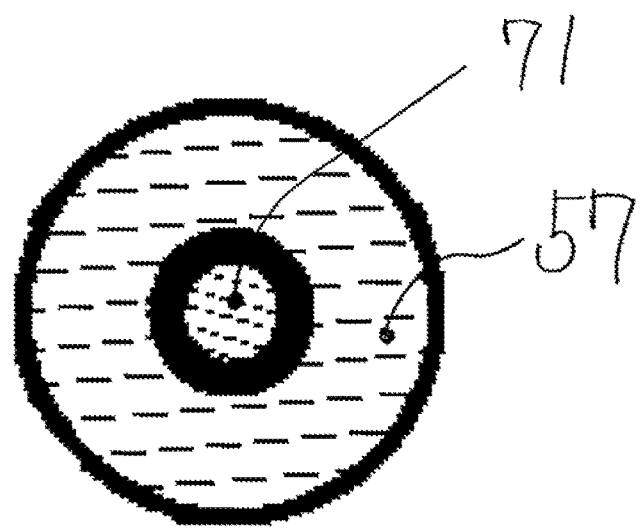
FIG. 8 is an enlarged view illustrating a cross-section taken along the line B-B of FIG. 1.

Note that, according to this embodiment, tubular members 57 are provided between the tightening wire holders 51 arranged in each of the inner link portions 5, and the tightening wire 71 passes through the tubular members 57 as illustrated in FIG. 8, so that the minimum distance between each of the tightening wire holders 51 is restricted. As a result, it is possible to prevent a variation of the minimum distance between the tightening wire holders 51 when the tightening wire 71 is tightened using the tightener 7. Therefore, it is possible to regularly set the anti-slip body 1 with respect to the tire 500.

Note that, according to this embodiment, the tubular member 57 is arranged movably between the tightening wire holders 51. However, the tubular members 57 may be fixed to the tightening wire holder 51 (not shown). Alternatively, the tubular member 57 may also be omitted (not shown).

Further, the wire winding mechanism 74 internally includes a winder for the tightening wire, a biasing unit for rotating the winder in a winding direction of the tightening wire 71, and a control unit for controlling rotation of the winder. The control unit for controlling rotation of the winder is configured to select one of an extraction state in which the tightening wire 71 can be extracted from the winder, a winding state in which the tightening wire 71 is automatically wound around the winder, and a lock state in which the rotation of the winder is locked (fixed). In addition, the internal structure has a locking mechanism for preventing the rotation of the winder in the extracting direction of the tightening wire 71 in the winding state in which the tightening wire 71 is automatically wound around the winder (the internal structure of the wire winding mechanism 74 is not shown). Note that the wire winding mechanism 74 may be formed using a technique of a wire winding mechanism used in the tire anti-slip device known in the art. In addition, the wire winding mechanism 74 according to the present invention may be configured to manually rotate the winder of the tightening wire (not shown). Further, instead of winding the extracted tightening wire 71 using the wire winding mechanism, the tightening wire 71 may be locked and fixed to locking protrusions (not shown) provided in a plurality of outer link portions.

Figure 9:
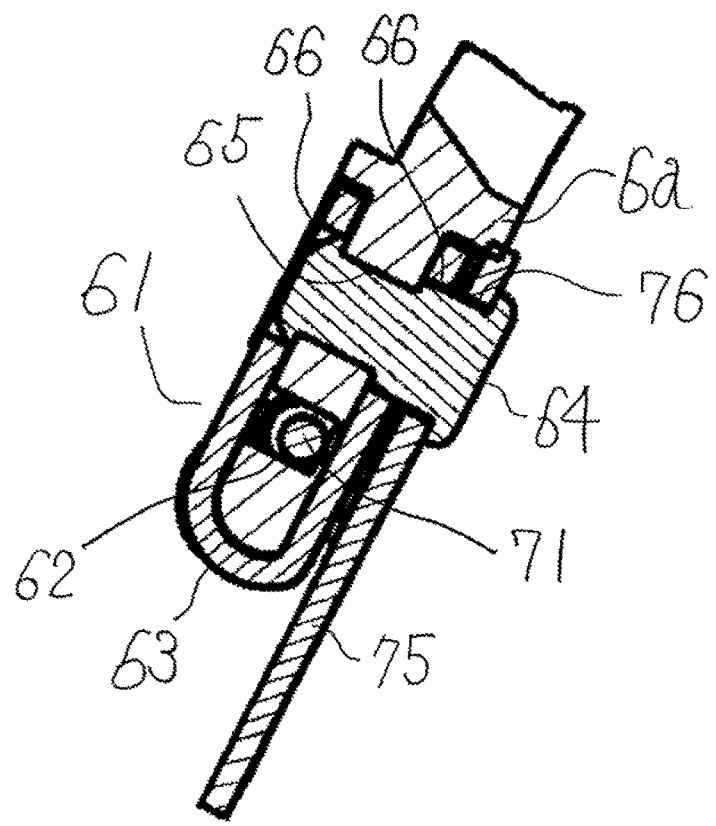
FIG. 9 is an enlarged view illustrating a cross-section taken along the line C-C of FIG. 2.

According to this embodiment, between the wire access hole 21*b* formed in the outer link portion 24 of the wire guide member 2 and the wire winding mechanism 74, the tightening wire holder 61 is disposed in the outer link portion 6 (6*a*) of the anti-slip body 1, and the structure of the tightening wire holder 61 includes a concave portion 62 formed as an internal space larger than a diameter of the tightening wire 71 formed in the outer link portion 6 (6*a*), an approximately U-shaped cover member 63 arranged to cover the concave portion 62, and a pin-shaped member 64 for fixing the cover member 63 to the outer link portion 6 (6*a*) as illustrated in FIG. 9. By fixing the hole 65 formed in the outer link portion 6 and the holes 66 formed in both ends of the cover member 63 using the pin-shaped member 64, the cover member 63 is connected to the outer link portion 6 not to be easily removed. Note that, as the pin-shaped member 64, a pin-shaped fixture known in the art, such as a grommet (eyelet), a rivet, and a bolt/nut set may be employed. Note that, when a plurality of outer link portions 6 of the anti-slip body are arranged between the wire access hole 23 of the wire guide member 2 and the wire winding mechanism 74, the tightening wire holders 61 are arranged in nearly the same circumference as that of the outer link portions 6 when the anti-slip body 1 is mounted to the tire. However, the tightening wire holders 61 may not necessarily be formed in all of the outer link portions 6 (not shown).

An outer distance restricting wire holder 81 configured to hold an outer distance restricting wire 8 is provided in the outer link portion 6 where the tightening wire holder 61 is not arranged out of the outer link portions 6 of the anti-slip body 1. In addition, large diameter portions 80 are formed in both ends of the outer distance restricting wire 8, so that one end 80*a* of the large diameter portion of the outer distance restricting wire 8 is fixed to an outer distance restricting wire end fixing portion 26 formed in the outer link portion 24 of the wire guide member 2, and the other end 80*b* of the large diameter portion of the outer distance restricting wire 8 is fixed to the outer distance restricting wire holder 81 disposed in the outer link portion 6*b* where the other end of the connecting member 75 is fixed. Note that the other end 80*b* of the large diameter portion may be fixed to the connecting member 75 fixed to the outer distance restricting wire holder 81, and the other end 80*b* of the large diameter portion may be nipped between the outer link portion 6*b* and the connecting member 75 (this similarly applies to other parts of the invention).

Figure 11:
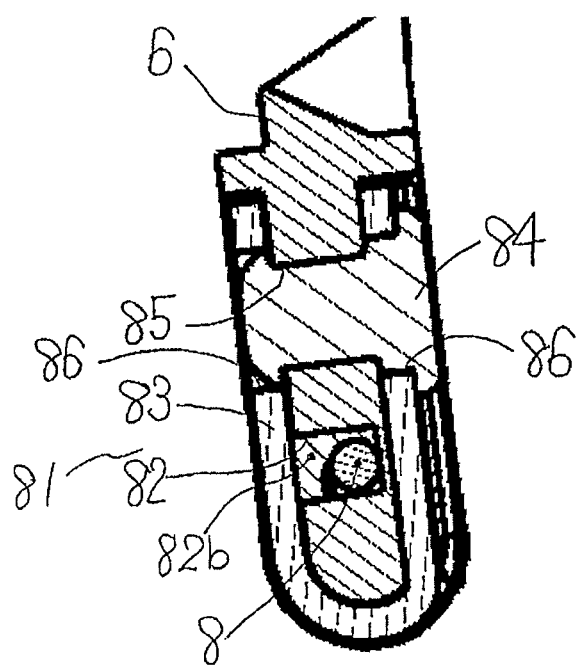
FIG. 11 is an enlarged view illustrating a cross-section taken along the line E-E of FIG. 2.

The outer distance restricting wire 8 is fixed to the outer distance restricting wire holders 81 disposed in the outer link portions 6 and is held in this state. The outer distance restricting wire holders 81 are arranged in approximately the same circumference as that of the outer link portions 6 when the anti-slip body 1 is mounted to the tire. As illustrated in FIG. 11, the outer distance restricting wire holder 81 includes a concave portion 82 having an internal space larger than a diameter of the outer distance restricting wire 8 formed in the outer link portion 6, a spacer portion 82*b* configured to reduce the internal space of the concave portion 82, an approximately U-shaped cover member 83 arranged to cover the concave portion 82 and the spacer portion 82*b*, and a pin-shaped member 84 for fixing the cover member 83 to the outer link portion 6. By fixing a hole 85 formed in the outer link portion 6 and holes 86 formed in both ends of the cover member 83 using the pin-shaped member 84, the cover member 83 is connected to the outer link portion 6 not to be easily removed. Note that, as the pin-shaped member 84, a pin-shaped fixture known in the art, such as a grommet (eyelet), a rivet, and a bolt/nut set may be employed. Note that the outer distance restricting wire 8 may be held movably by setting the internal space of the concave portion 82 of at least a part of the outer distance restricting wire holders 81 to be larger than the diameter of the outer distance restricting wire 8.

Figure 12:
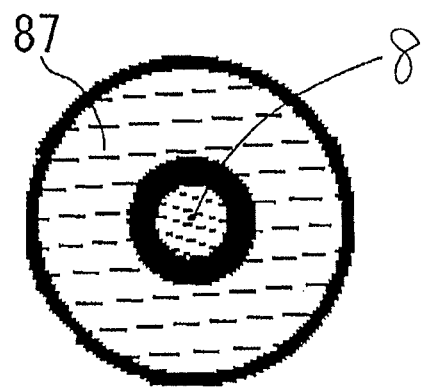
FIG. 12 is an enlarged view illustrating a cross-section taken along the line F-F of FIG. 2.

Further, a tubular member 86 is arranged in each space between the outer distance restricting wire holders 81 formed in the outer link portions 6. As illustrated in FIG. 12, as the outer distance restricting wire 8 passes through the tubular members 86, the minimum distance between each of the outer distance restricting wire holders 81 is restricted. Therefore, it is possible to prevent a deviation of the fixing position of the distance restricting wire 8 fixed to the outer distance restricting wire holder 81 and regularly set the anti-slip body 1 with respect to the tire 500.

In this embodiment, the tubular member 86 is arranged movably between the outer link portions 6. Alternatively, the tubular member 86 may be fixed to the outer distance restricting wire holder 81 (not shown), or may also be omitted (not shown).

Figure 10:
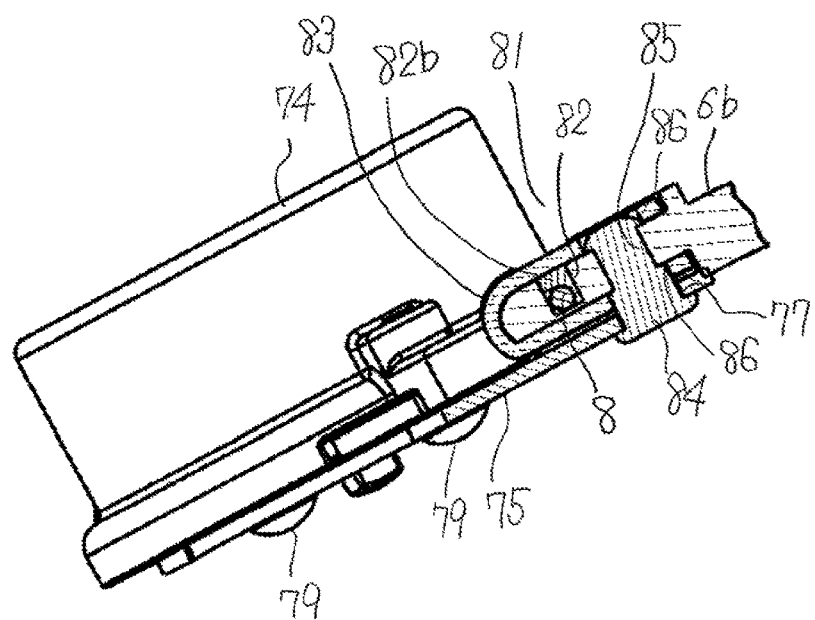
FIG. 10 is an enlarged view illustrating a cross-section taken along the line D-D of FIG. 2.

In this embodiment, as illustrated in FIGS. 9 and 10, the wire winding mechanism 74 is configured such that a connecting member 75 is fixed on a backside using a screw member 79, holes 76 and 77 are formed in one end and the other end of an extension of the connecting member 75 fixed to the backside of the wire winding mechanism 74, the hole 76 of the one end of the extension of the connecting member 75 fixed to the backside of the wire winding mechanism 74 is fixed to the outer link portion 6*a* using the pin-shaped member 64 when the cover member 63 is fixed using the pin-shaped member 64, and the hole 77 of the other end of the extension of the connecting member 75 fixed to the backside of the wire winding mechanism 74 is fixed to the outer link portion 6b using the pin-shaped member 84 when the cover member 83 is fixed using the pin-shaped member 84. Alternatively, the wire winding mechanism 74 and the connecting member 75 may also be formed integrally.

Figure 24:
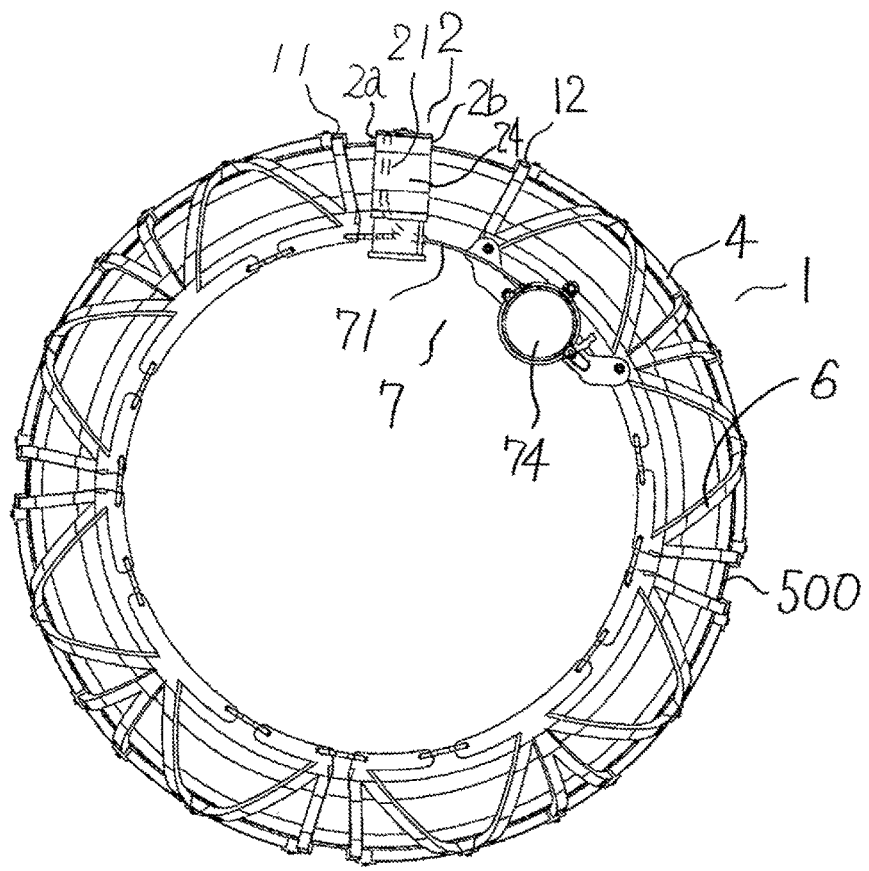
FIG. 24 is a front view illustrating a mount state of the anti-slip device according to the second embodiment of the invention as seen from the outer side of the tire.
Figure 28:
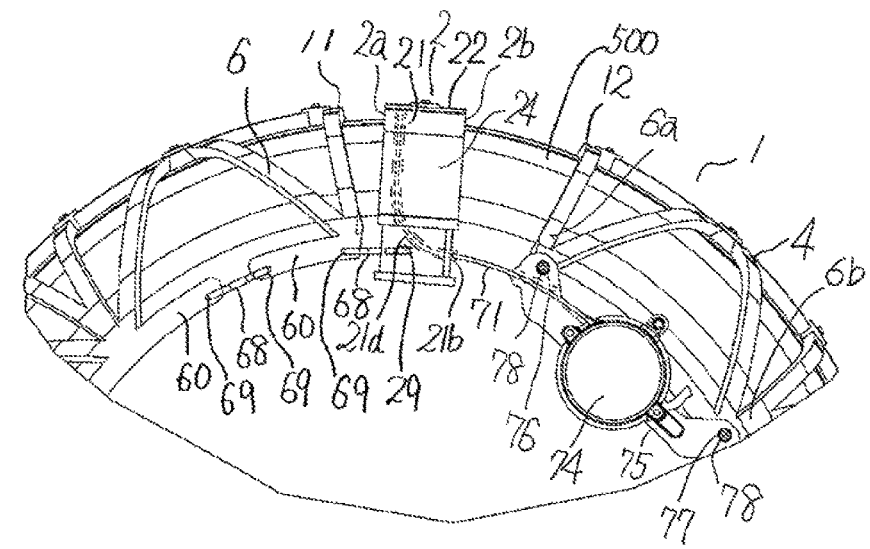
FIG. 28 is an enlarged view illustrating main parts of FIG. 24.

According to a modification of this embodiment, without using the outer distance restricting wire 8, a ring member connecting hole 69 where an outer distance restricting ring member 68 can be connected may be formed in the outer link portion 24 of the wire guide member 2 and the outer link portion 6 of the anti-slip body 1 so that a distance between each of the outer link portions is restricted by connecting the outer distance restricting ring member 68 to the ring member connecting hole 69 (refer to FIGS. 24 and 28 of Embodiment 2). In addition, the distance between the outer link portions may be restricted by employing both the outer distance restricting wire 8 and the outer distance restricting ring member 68 (not shown).

Figure 13:
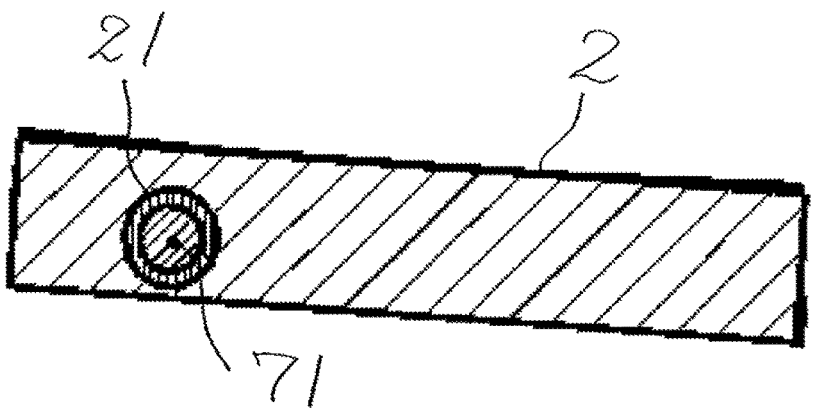
FIG. 13 is an enlarged view illustrating a cross-section taken along the line G-G of FIG. 2.

As illustrated in FIG. 13, the wire guide 21 is a tubular component insert-molded to the wire guide member 2. Alternatively, for example, a concave portion formed in the anti-slip body (on either front or rear surface) and a wire insertion member arranged inside the concave portion may constitute the wire guide portion (not shown). In this case, a plurality of latch members capable of at least partially blocking a periphery of the concave portion to prevent removal of the wire may be provided (not shown).

At least one of the inner link portion positioned in one end portion 2 of the anti-slip body 1 and the wire access hole positioned in the outer link portion may be protruded from the anti-slip body, so that a wire guide body separate from the anti-slip body can be provided (not shown).

In the wire guide portion 21, assuming that the wire diameter of the tightening wire 71 is set to "A mm," if radii of curvature of the curved portions 21c and 21d formed in the wire guide portion 21 are set to be equal to or larger than "3 $A^2$ mm," it is possible to prevent a frictional resistance of the tightening wire 71 against the wire guide portion 21 from excessively increasing. Therefore, it is possible to smoothly perform the tightening operation of the tightening wire 71 using the tightener 7. Note that, since the tightening wire 71 is a steel wire having a diameter of 2.5 mm in this embodiment, the radii of curvature of the curved portions 21c and 21d are preferably set to be equal to or larger than 18.75 mm (in this embodiment, the radius of curvature of the curved portion of the tightening wire is set to 35 mm). Note that a diameter or material of the wire is not limited thereto, and a non-metal wire such as a rope formed of Kevlar fiber may also be employed. In addition, although the outer distance restricting wire 8 of this embodiment is a steel wire having a diameter A of 3.0 mm, a diameter or material of the wire is not limited thereto, and a non-metal wire such as a rope formed of Kevlar fiber may also be employed.

Figure 14:
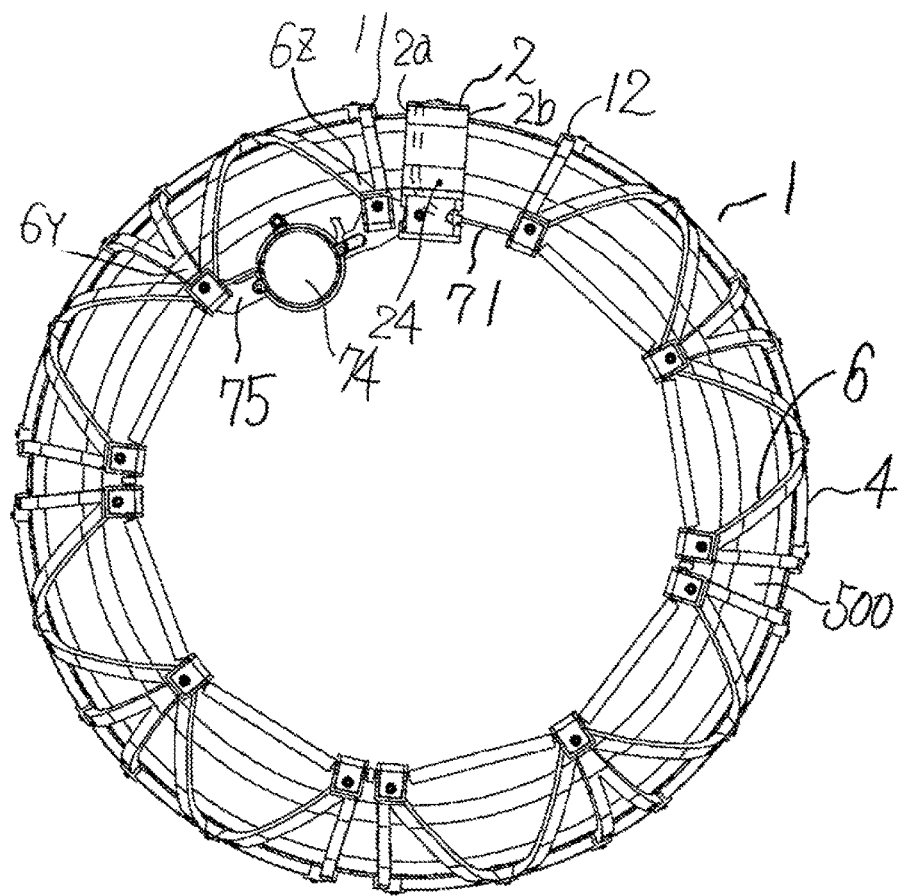
FIG. 14 is a front view illustrating a modification of the first embodiment of the invention as seen from the outer side of the tire.
Figure 15:
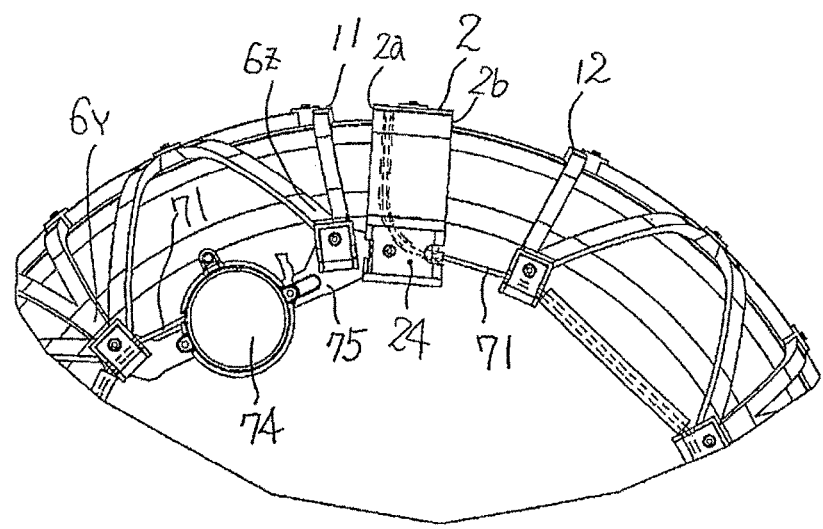
FIG. 15 is an enlarged view illustrating main parts of FIG. 14.

Further, as a modification of this embodiment, as illustrated in FIGS. 14 and 15, the wire winding mechanism 74 may be disposed between the outer link portion 6z positioned in the one end portion 11 of the anti-slip body 1 and the outer link portion 6y neighboring to the outer link portion 6z, and may be configured such that one end of the extension of the connecting member 75 fixed to the backside of the wire winding mechanism 74 is fixed to the outer link portion 6z of the anti-slip body 1 and the outer link portion 24 of the wire guide member 2, and the other end of the extension of the connecting member 75 is fixed to the outer link portion 6y of the anti-slip body 1.

Note that the arrangement position of the wire winding mechanism 74 is not limited to the embodiments and modifications described above. Alternatively, the wire winding mechanism 74 may be disposed in any position between the outer link portion 6a of the anti-slip body 1 and the outer link portion 24 of the wire guide member 2, and one end and the other end of the extension of the connecting member 75 may be fixed to any position of the outer link portion between the outer link portion 6a and the outer link portion 24 (not shown).

Figure 16:
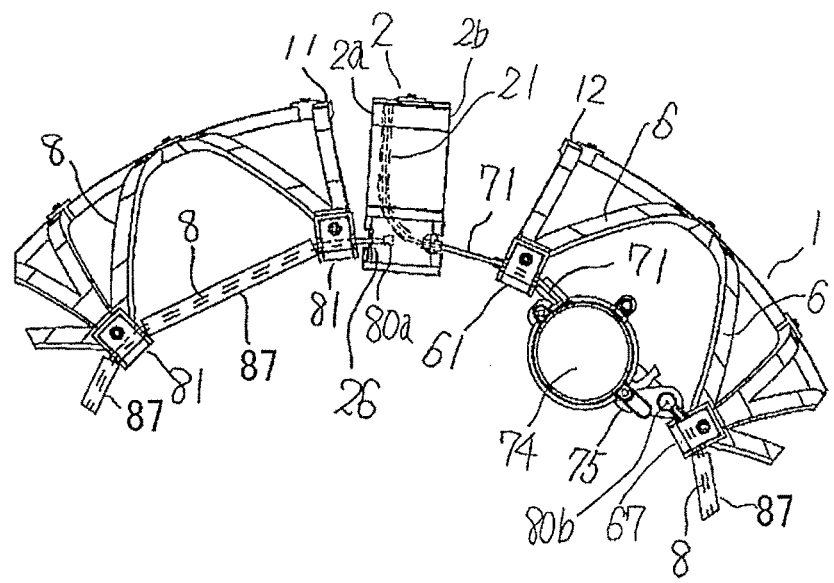
FIG. 16 is an enlarged view illustrating main parts of an anti-slip device according to another modification of the first embodiment of the invention as seen from the outer side of the tire.

Further, the connecting member 75 may be fixed to the outer link portion 6 using fixing means separate from the fixing structure of the cover member 63 to the outer link portion 6 (not shown). According to another modification of the invention, for example, as illustrated in FIG. 16, the wire winding mechanism 74 may not have the extension provided in one of the connecting members 75 or may not be fixed to the outer end portion 6. Instead, the arrangement position of the wire winding mechanism 74 may be restricted by the tightening wire 71. Alternatively, the other end 80b of the outer distance restricting wire 8 may be fixed to the connecting member 75 fixed to the backside of the wire winding mechanism 74.

Figure 17:
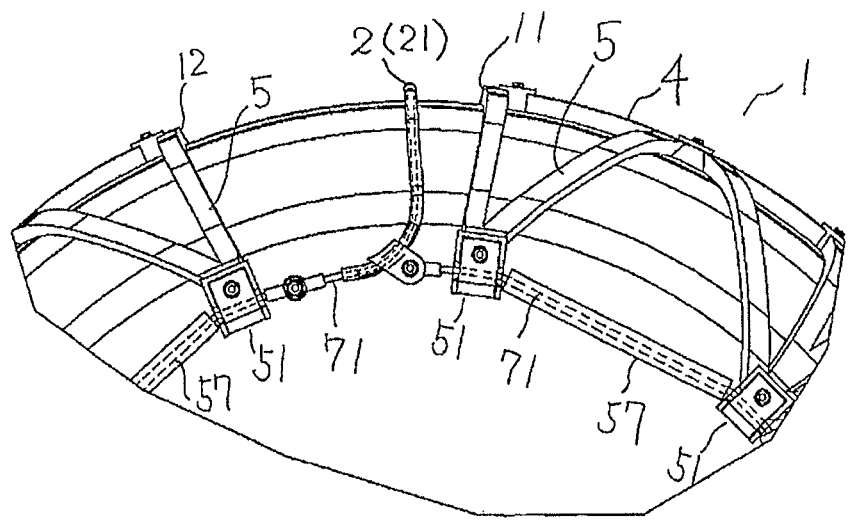
FIG. 17 is an enlarged view illustrating main parts of the anti-slip device according to another modification of the first embodiment of the invention as seen from the inner side of the tire.
Figure 18:
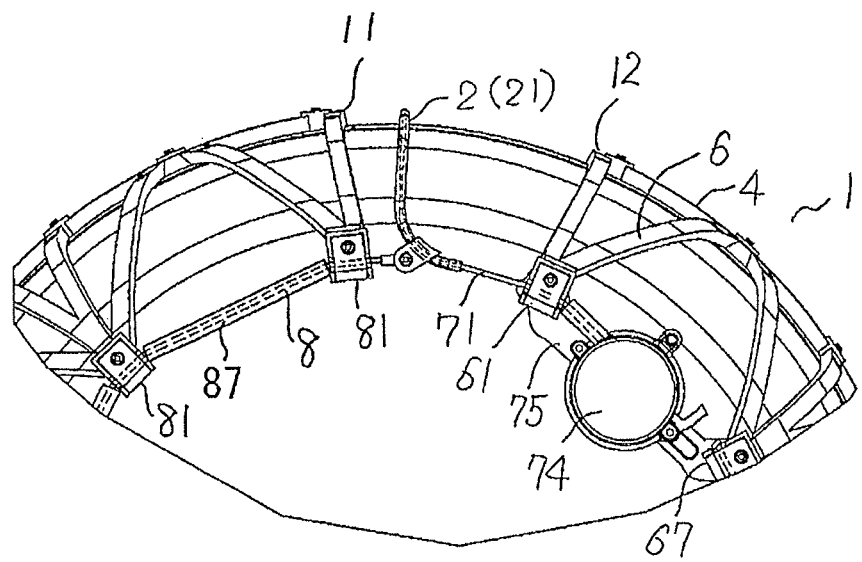
FIG. 18 is an enlarged view illustrating main parts of the anti-slip device according to another modification of the first embodiment of the invention as seen from the outer side of the tire.

According to still another modification of the invention, a component formed of a material having high strength and high wear resistance is used in the wire guide member 2. As a result, as illustrated in FIGS. 17 and 18, the wire guide member 2 may be formed only using a tubular wire guide portion 21.

Figure 19:
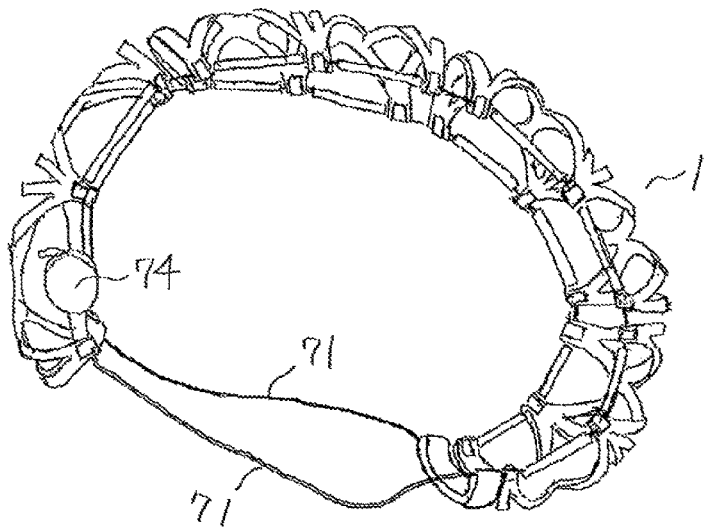
FIG. 19 is a schematic diagram illustrating a process of mounting the anti-slip device to a tire according to the first embodiment of the invention.

In order to mount the tire anti-slip device according to the present invention to the tire 500, first, the control unit of the wire winding mechanism 74 is set to the extracted state, and the tightening wire 71 is extracted from the wire winding mechanism 74 as illustrated in FIG. 19. Then, the control mechanism of the wire winding mechanism 74 is set to the lock state.

Figure 20:
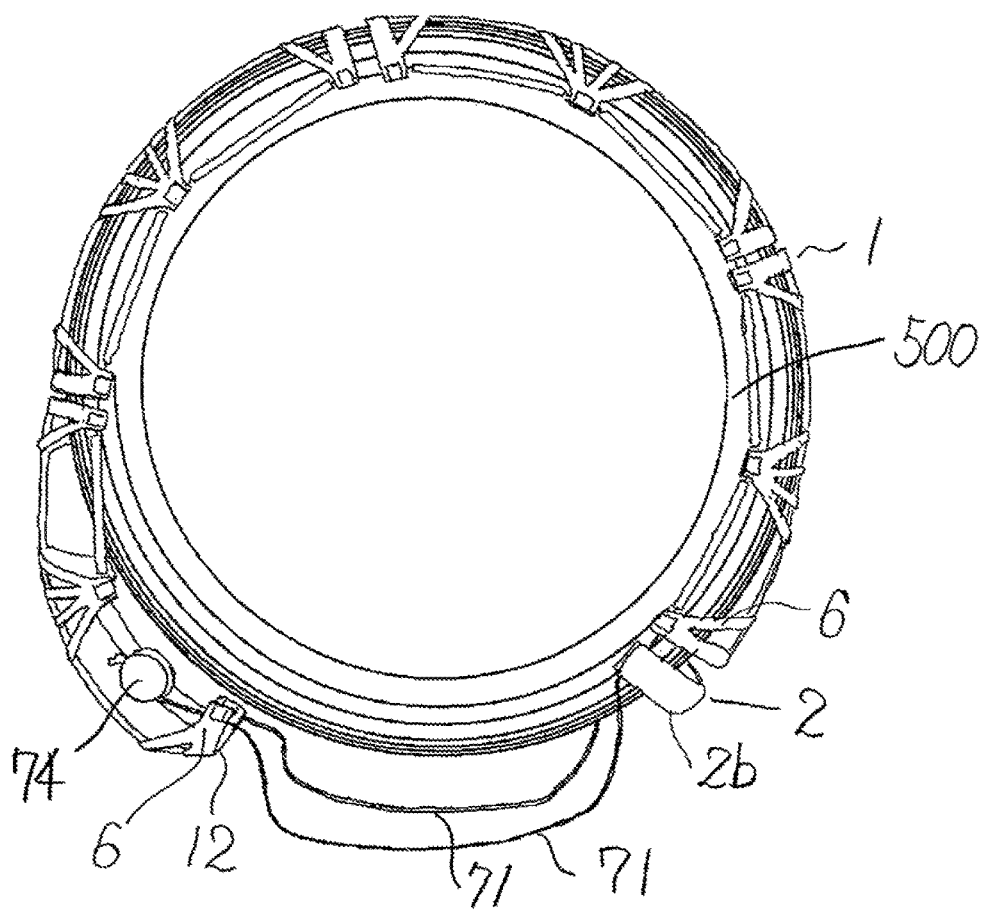
FIG. 20 is a schematic diagram illustrating a process of mounting the anti-slip device to the tire according to the first embodiment of the invention.

Then, as illustrated in FIG. 20, the tightening wire 71 disposed in the inner end portion 5 between the other side face 2b of the wire guide member 2 and the facing end portion 12 of the anti-slip body 1 is extracted toward the outer end portion 6 of the anti-slip body 1 (the outer end portion 24 of the wire guide member). In addition, the anti-slip device is installed to the tire 500 from the upside such that the tightening wire 71 passes through the outer side face of the tire 500 while a widened portion between the other side face 2b of the wire guide member 2 and the facing end portion 12 of the anti-slip body 1 is directed downward.

Figure 21:
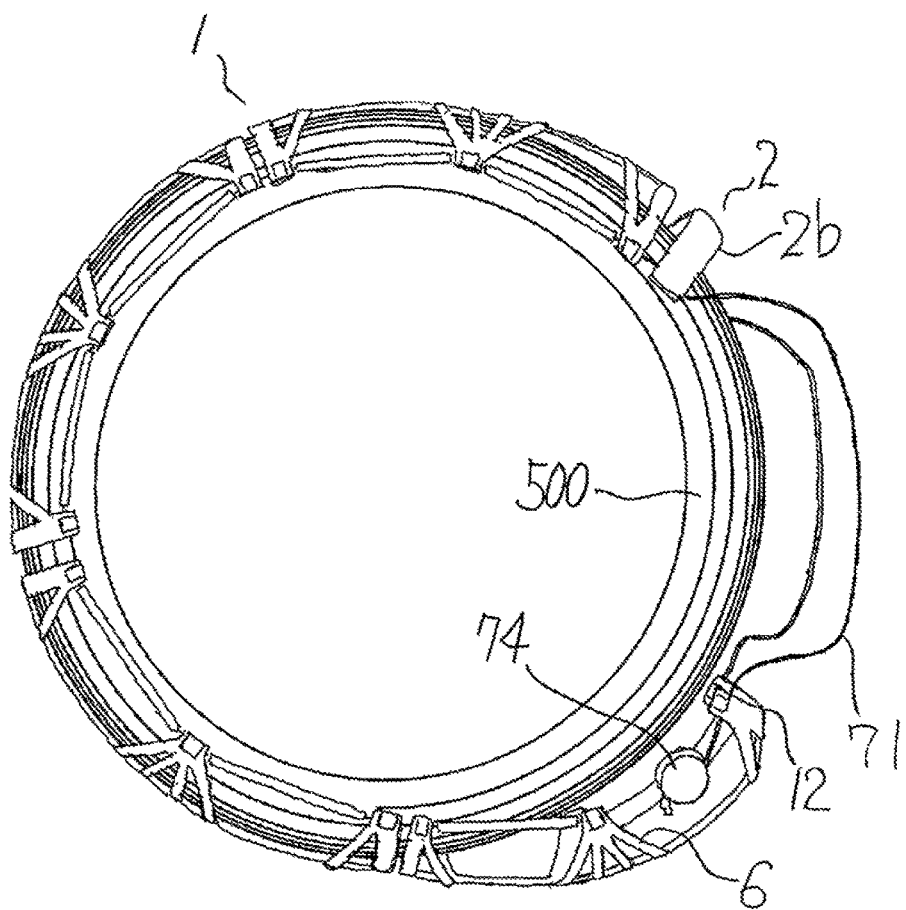
FIG. 21 is a schematic diagram illustrating a process of mounting the anti-slip device to the tire according to the first embodiment of the invention.

Then, a vehicle is moved until the portion between the other side face 2b of the wire guide member 2 and the facing end portion 12 of the anti-slip body 1 is positioned to be separate from the ground as illustrated in FIG. 21.

Figure 22:
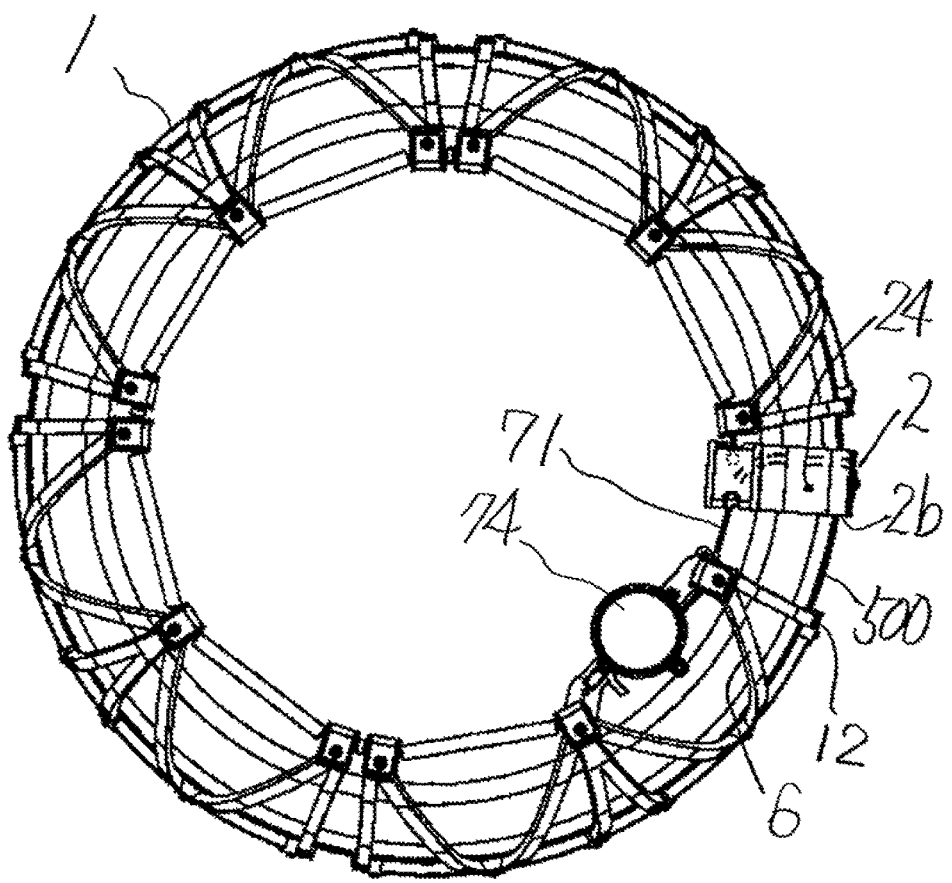
FIG. 22 is a schematic diagram illustrating a process of mounting the anti-slip device to the tire according to the first embodiment of the invention.

Then, by switching the control mechanism of the wire winding mechanism 74 to a winding state, the tightening wire 71 is drawn as illustrated in FIG. 22 such that the distance between the inner link portion 23 of the wire guide member 2 and the inner link portion 5 positioned in the facing end portion 12 of the anti-slip body 1 and the distance between the outer link portion 24 of the wire guide member 2 and the outer link portion 6 positioned in the facing end portion 12 of the anti-slip body 1 are reduced at the same time. Further, by driving the vehicle while the tightening wire 71 is wound, the tightly fitting state of the anti-slip device to the tire 500 advances so that the anti-slip device is secured to the tire 500.

Embodiment 2

Figure 23:
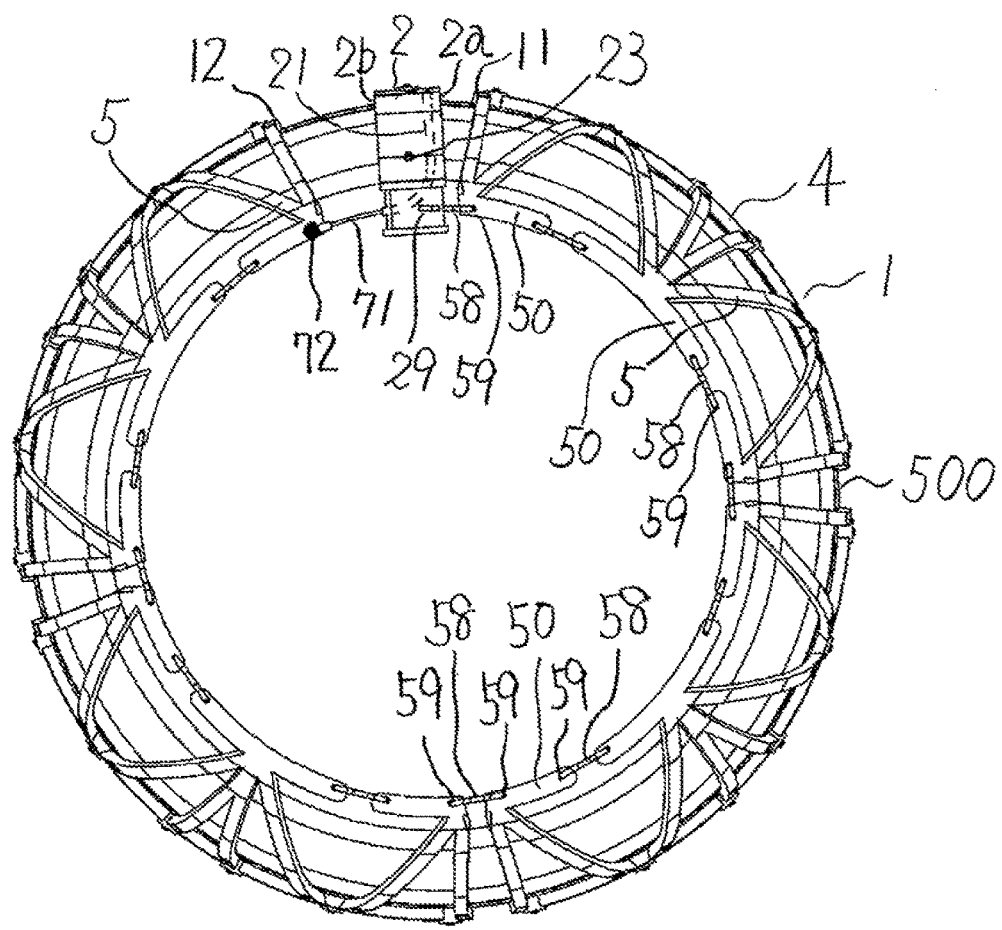
FIG. 23 is a rear view illustrating a mount state of an anti-slip device according to a second embodiment of the invention as seen from the inner side of the tire.
Figure 25:
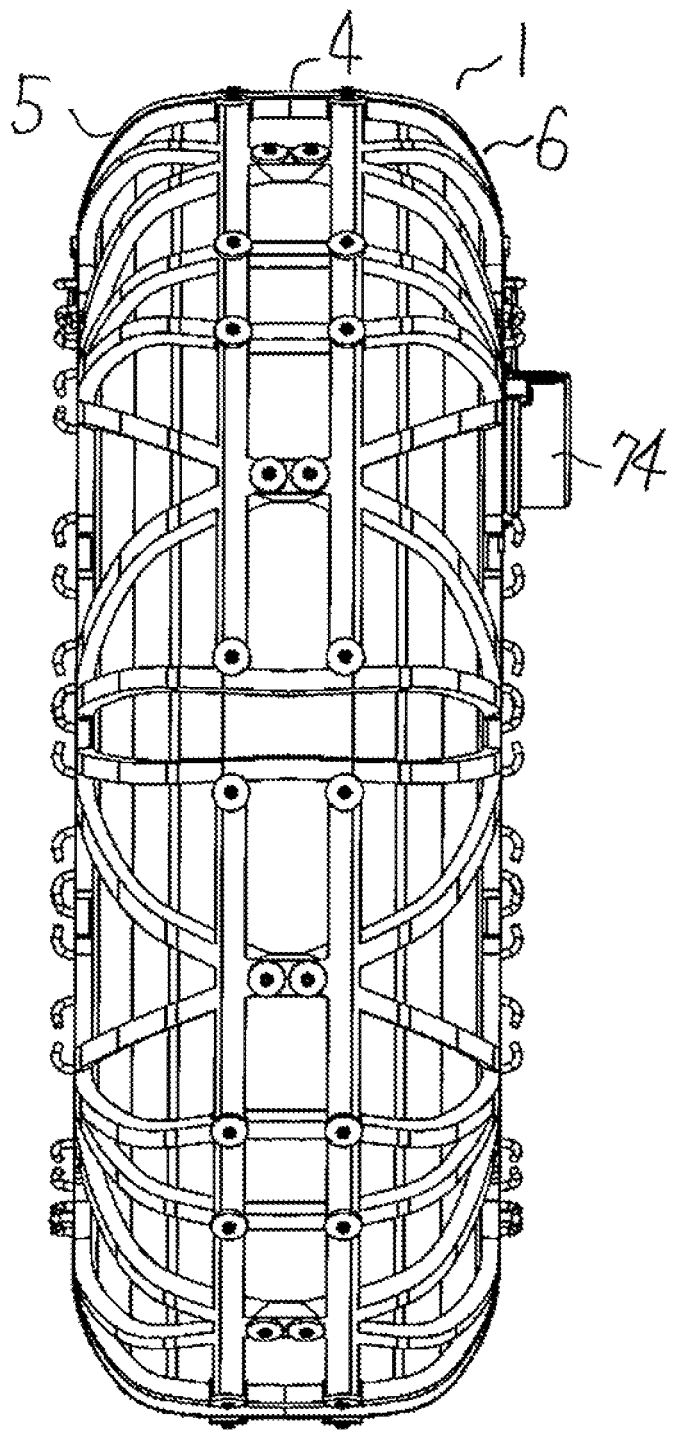
FIG. 25 is a left side view illustrating a mount state of the anti-slip device according to the second embodiment of the invention as seen from the left side of the tire.
Figure 26:
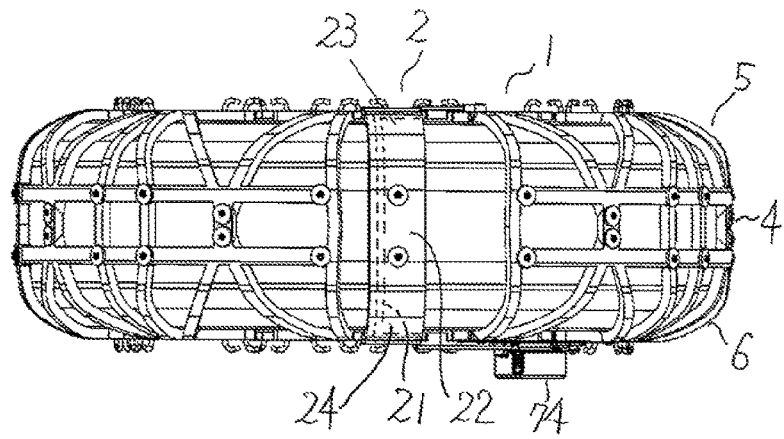
FIG. 26 is a top plan view illustrating a mount state of the anti-slip device according to the second embodiment of the invention as seen from the upper side of the tire.
Figure 27:
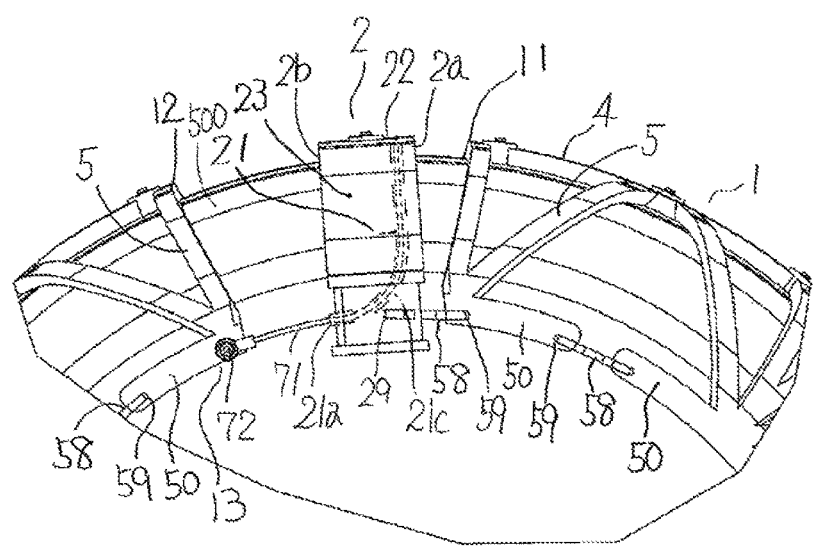
FIG. 27 is an enlarged view illustrating main parts of FIG. 23.

FIGS. 23 to 28 illustrate another preferred embodiment of the invention. FIG. 23 is a rear view illustrating a mount state of the anti-slip device according to a second embodiment of the invention as seen from the inner side of the tire. FIG. 24 is a front view illustrating a mount state of the anti-slip device according to the second embodiment of the invention as seen from the outer side of the tire. FIG. 25 is a left side view illustrating a mount state of the anti-slip device according to the second embodiment of the invention as seen from the left side of the tire. FIG. 26 is a top plan view illustrating a mount state of the anti-slip device according to the second embodiment of the invention as seen from the upper side of the tire. FIG. 27 is an enlarged view illustrating main parts of FIG. 23, and FIG. 28 is an enlarged view illustrating main parts of FIG. 24.

The tire anti-slip device according to the second embodiment of the invention has an anti-slip body 1 shaped in a set of belts and mounted to a tire 500 of a vehicle along a circumferential direction. The anti-slip body 1 has a tread portion 4 formed of a flexible material such as polyurethane elastomer or rubber and provided with a ground portion making contact with the ground on its surface, a plurality of inner link portions 5 formed to protrude from the tread portion 4 to the inner side of the tire 500 in a width direction, a plurality of outer link portions 6 formed to protrude from the tread portion 4 to the outer side of the tire 500 in the width direction, and a tightener 7 for tightening a tightening wire 71 to tightly fit the anti-slip body 1 to the tire 500.

The tightener 7 of the anti-slip device has a wire guide member 2 provided with a wire guide portion 21 capable of guiding the tightening wire 71 toward the width direction of the tire 500. The wire guide member 2 is configured to maintain its one side face 2a with respect to the circumferential direction of the tire to be close to one end portion 11 of the anti-slip body 1 at all times. Note that one side position of the wire guide member 2 may also be integrated with the anti-slip body 1 (not shown).

The wire guide member 2 includes a tread portion 22 provided with a ground portion making contact with the ground on its surface, an inner link portion 23 formed to protrude from the tread portion 22 to the inner side of the tire in the width direction, and an outer link portion 24 formed to protrude from the tread portion 22 to the outer side of the tire in the width direction. The wire guide portion 21 has wire access holes 21a and 21b provided in positions of an inner link portion 23 and the outer link portion 24, respectively.

When the anti-slip device is mounted to the tire 500, a facing end portion 12 of the anti-slip body 1 is disposed to face the other side face 2b of the wire guide member 2. In addition, the anti-slip body is configured such that a distance between the inner link portion 23 of the wire guide member 2 and the inner link portion 5 of the anti-slip body 1 positioned in the facing end portion 12 and a distance between the outer link portion 24 of the wire guide member 2 and the outer link portion 6 positioned in the facing end portion 12 of the anti-slip body 1 are reduced at the same time when tightening using the tightener 7.

In the wire guide portion 21, curved portions 21c and 21d directed to the other side face 2b of the wire guide member 2 are formed in the positions of the inner link portion 23 and the outer link portion 24, respectively. Therefore, the wire access holes 21a and 21b of the wire guide portion 21 are directed toward the other side face 2b of the wire guide member 2 (directed toward the other end portion 12 of the anti-slip body 1 when the anti-slip device is mounted to the tire 500).

Note that, if the directions of the wire access holes 21a and 21b directed to the facing end portion 12 are set within a range of 0° (equal to the circumferential direction) to 45° inclined to the tire radial direction with respect to the tire circumferential direction while the anti-slip body 1 is mounted to the tire 500, it is possible to prevent a frictional resistance of the tightening wire 71 accessing the wire access holes 21a and 21b from excessively increasing.

The inner link portion 5 positioned in the facing end portion 12 of the anti-slip body 1 is provided with a tightening wire end fixing portion 13 used to fix a position of the end portion of the tightening wire 71 to the inner link portion 5 by holding a large diameter portion 72 formed in the end portion of the tightening wire 71. The tightening wire 71 having an end portion fixed to the tightening wire end fixing portion 13 passes through the wire access hole 21a formed in the inner link portion 23 of the wire guide member 2 and is extracted from the wire access hole 21b of the outer link portion 24 through the wire guide portion 21. Then, the tightening wire 71 is connected to a wire winding mechanism 74 disposed between the outer link portion 6a positioned in the facing end portion 12 of the anti-slip body 1 and the outer link portion 6b neighboring to the position of the facing end portion 12. As a result, a tightener can be obtained.

Further, the wire winding mechanism 74 internally includes an internal winder for the tightening wire, a biasing unit for rotating the winder in a winding direction of the tightening wire 71, and a control unit for controlling rotation of the winder. The control unit for controlling rotation of the winder is configured to select one of an extraction state in which the tightening wire 71 can be extracted from the winder, a winding state in which the tightening wire 71 is automatically wound around the winder, and a lock state in which the rotation of the winder is locked (fixed). In addition, the internal structure has a locking mechanism for preventing the rotation of the winder in the extracting direction of the tightening wire 71 in the winding state in which the tightening wire 71 is automatically wound around the winder (the internal structure of the wire winding mechanism 74 is not shown). Note that the wire winding mechanism 74 may be formed using a technique of a wire winding mechanism used in the tire anti-slip device known in the art. In addition, the wire winding mechanism 74 according to the present invention may have a configuration for manually rotating the winder of the tightening wire (not shown). Further, instead of winding the extracted tightening wire 71 using the wire winding mechanism, the tightening wire 71 may be locked and fixed to locking protrusions (not shown) provided in a plurality of outer link portions.

According to a modification of this embodiment, a tightening wire holder 61 may be arranged in the outer link portion 6 (6a) of the anti-slip body 1 between the wire access hole 21b formed in the outer link portion 24 of the wire guide member 2 and the wire winding mechanism 74. The structure of the tightening wire holder 61 may be similar to that of Embodiment 1 (not shown).

Note that, although the holes 76 and 77 are formed in one end and the other end of the extension of the connecting member 75 fixed to the backside of the wire winding mechanism 74, and are fixed to the hole 55 formed in the outer link portion 6 using the pin-shaped member 78 in this embodiment, the wire winding mechanism 74 and the connecting member 75 may also be formed integrally.

According to this embodiment, ring member connecting holes 29 and 59 where the inner distance restricting ring members 58 can be connected are formed in the inner link portion 23 of the wire guide member 2 and each inner link portion 5 of the anti-slip body 1. A distance between each of the inner link portions 5 and 23 is restricted by connecting the inner distance restricting ring members 58 to the ring member connecting holes 29 and 59. In addition, inner arm portions 50 extending toward the inner link portions neighboring to a part of the inner link portions 5 are formed, and the ring member connecting hole 59 of the inner link portion 5 where the inner arm portion 50 is formed is provided in an end of the inner arm portion 50.

According to the present invention, instead of restricting the distance between each of the inner link portions 5 and 23 by connecting the inner distance restricting ring members 58 to the ring member connecting holes 59, an inner distance restricting wire holder where the inner distance restricting wire passes may be disposed in at least a part of the inner link portions 5 and/or 23 of the anti-slip body 1, and the inner distance restricting wire may be held by the inner distance restricting wire holders arranged in each of the inner link portions (not shown). In this case, each of the both ends of the inner distance restricting wire may be provided with a large diameter portion, so that one of the large diameter portions is fixed to an inner distance restricting wire end fixing portion formed in the inner link portion of the wire guide member, and the other large diameter portion is fixed to an inner distance restricting wire end fixing portion formed in the inner link portion positioned in the facing end portion of the anti-slip body (not shown). Note that the inner distance restricting wire holders are configured similar to the outer distance restricting wire holders 81 of Embodiment 1.

According to this embodiment, the ring member connecting holes 29 and 69 where the outer distance restricting ring members 68 can be connected are formed in the outer link portion of the wire guide member and the outer link portion 6 of the anti-slip body 1 where no tightening wire holder 61 is provided. A distance between each of the outer link portions 6 is restricted by connecting the outer distance restricting ring members 68 to the ring member connecting holes 29 and 69. A part of the outer link portions 6 are provided with outer arm portions 60 extending toward the neighboring outer link portions 6, and the ring member connecting hole 69 of the outer link portion 6 provided with the outer arm portion 60 is formed in an end portion of the outer arm portion 60.

According to the present invention, a distance between each of the outer link portions 6 is restricted by connecting the outer distance restricting ring member 68 to the ring member connecting hole 69. Instead, the outer distance restricting wire holder configured to hold the outer distance restricting wire may be provided in at least a part of the outer link portions 6 of the anti-slip body 1. In addition, the outer distance restricting wire may be held by the outer distance restricting wire holders arranged in each of the outer link portions. Furthermore, each of both ends of the outer distance restricting wire may be provided with the large diameter portion. Moreover, one end of the outer distance restricting wire may be fixed to an outer distance restricting wire end fixing portion formed in the outer link portion of the wire guide member, and the other end of the outer distance restricting wire may be fixed to an outer distance restricting wire end fixing portion formed in the outer link portion where the other end of the connecting member fixed to the backside of the wire winding mechanism is fixed (not shown). Note that the outer distance restricting wire holders are configured similar to the outer distance restricting wire holders 81 of Embodiment 1.

The configuration of the wire guide portion 21 according to this embodiment and the sequence of mounting the tire anti-slip device according to this embodiment to the tire are similar to those of Embodiment 1, and they will not be repeatedly described herein.

Embodiment 3

Figure 29:
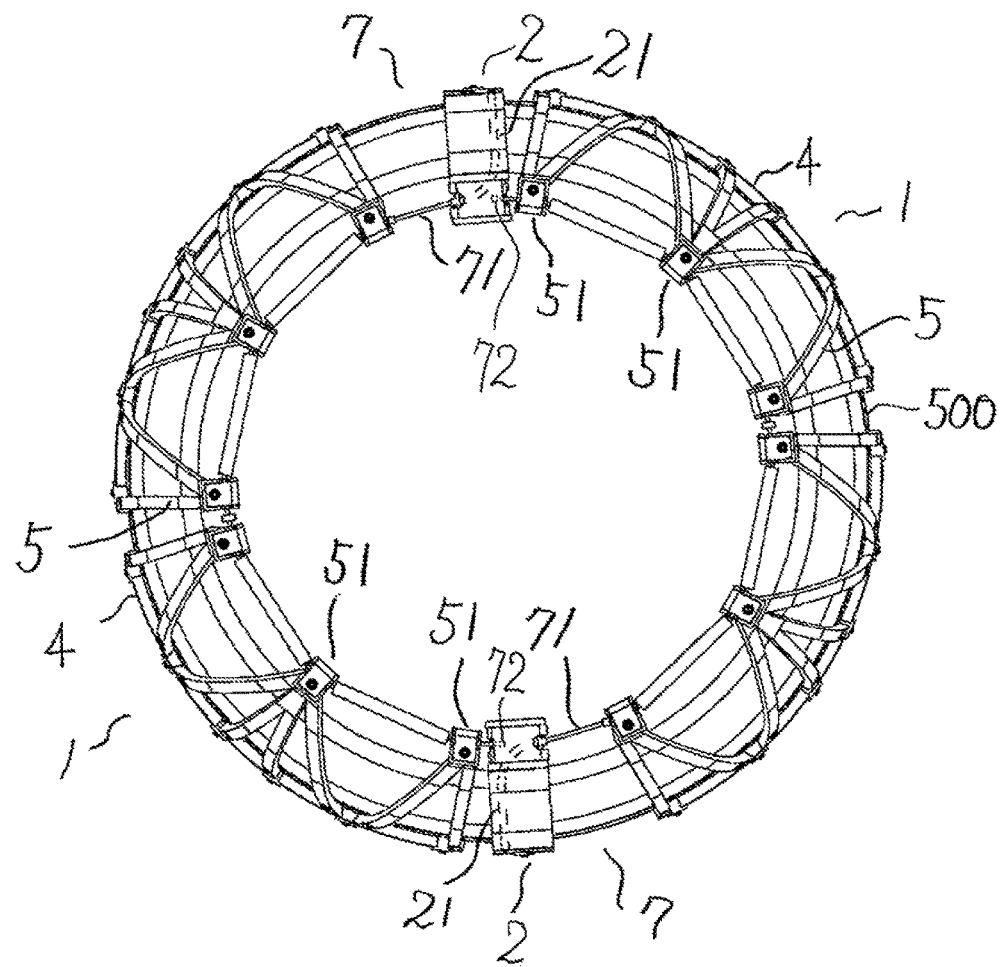
FIG. 29 is a rear view illustrating a mount state of an anti-slip device according to a third embodiment of the invention as seen from the inner side of the tire.
Figure 30:
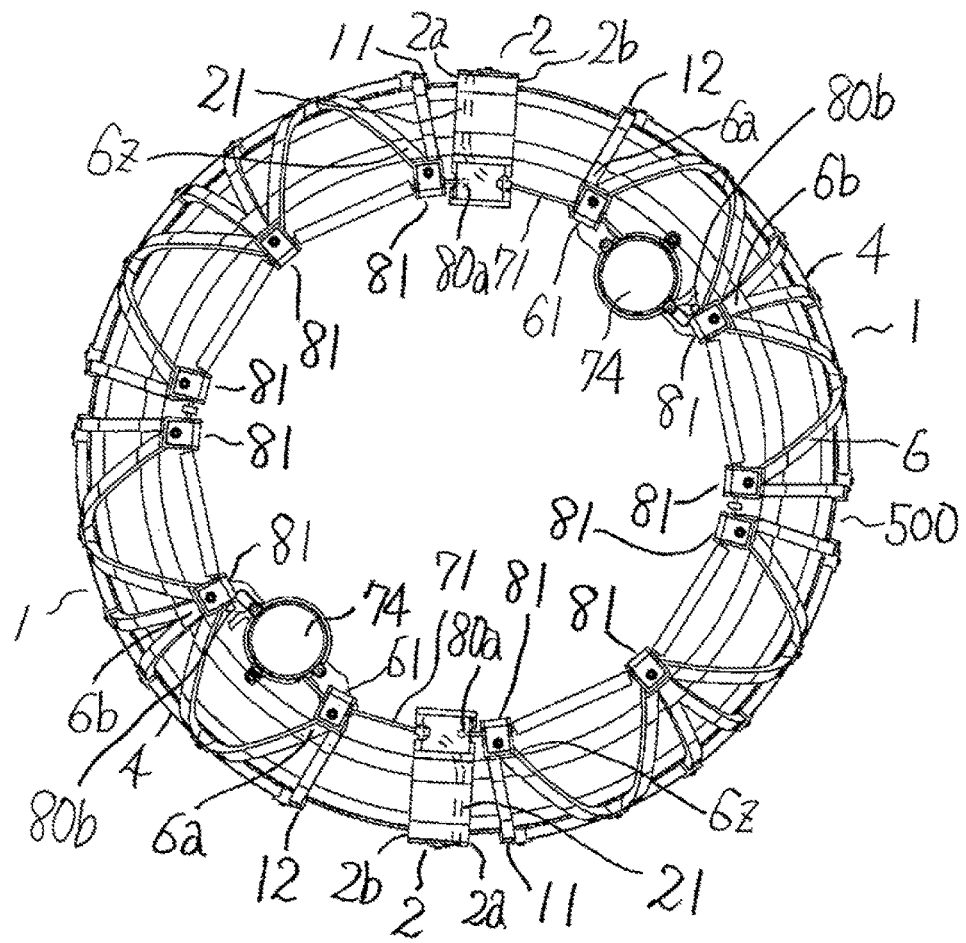
FIG. 30 is a front view illustrating a mount state of the anti-slip device according to the third embodiment of the invention as seen from the outer side of the tire.
Figure 31:
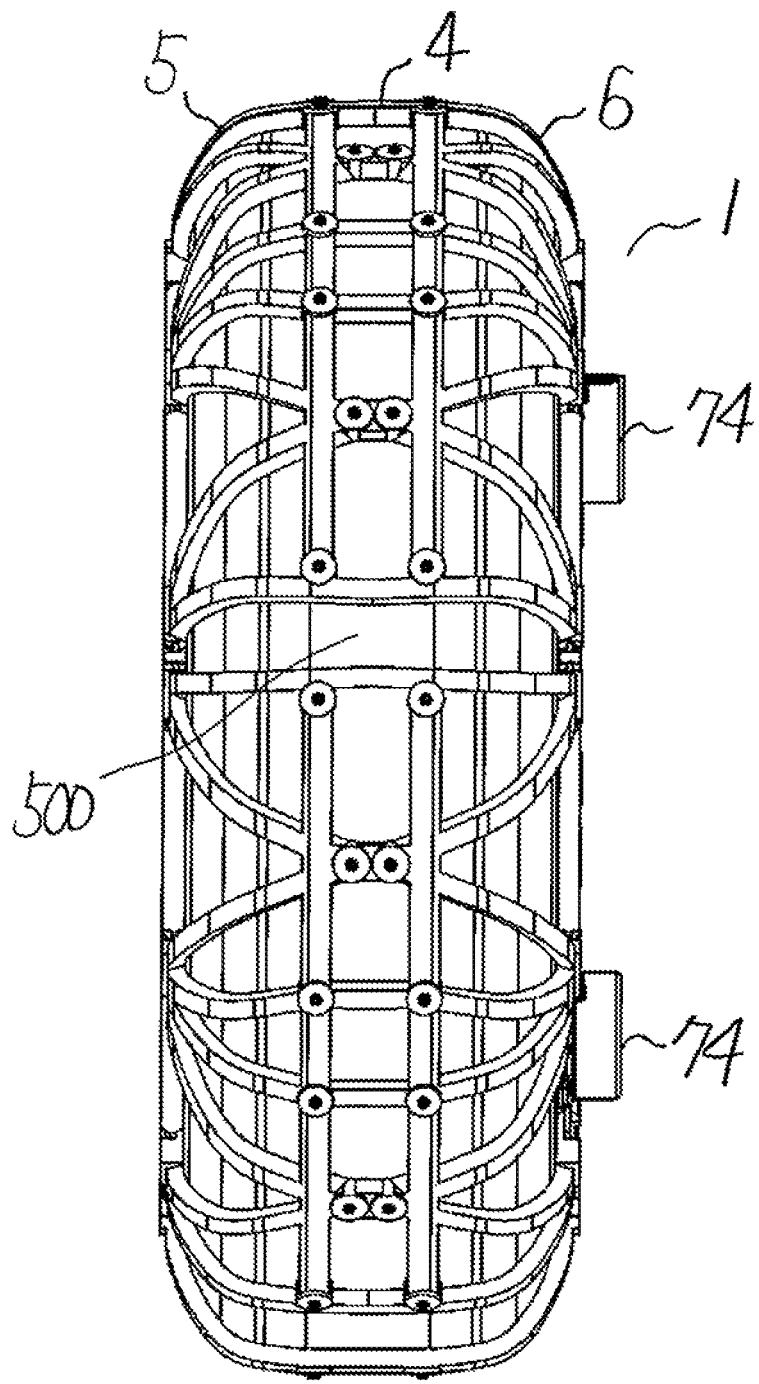
FIG. 31 is a left side view illustrating a mount state of the anti-slip device according to the third embodiment of the invention as seen from the left side of the tire.
Figure 32:
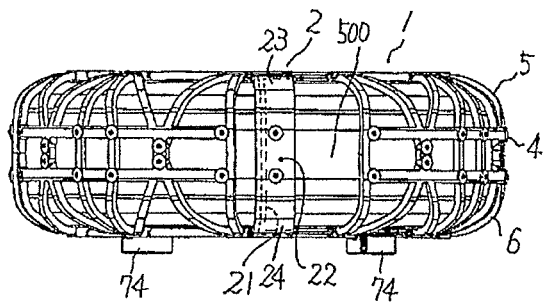
FIG. 32 is a top plan view illustrating a mount state of the anti-slip device according to the third embodiment of the invention as seen from the upper side of the tire.
Figure 33:
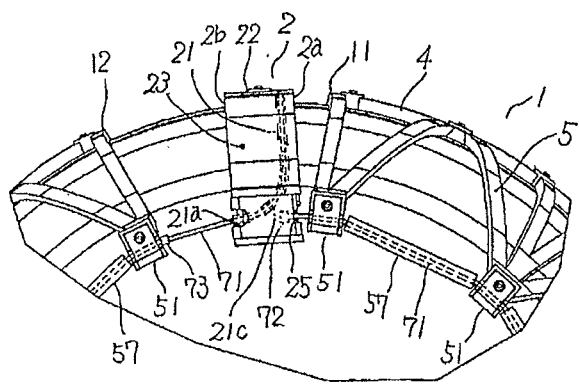
FIG. 33 is an enlarged view illustrating main parts of FIG. 29.
Figure 34:
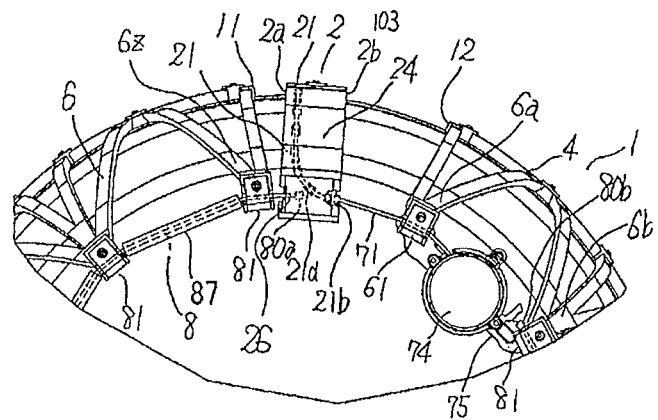
FIG. 34 is an enlarged view illustrating main parts of FIG. 30.

FIGS. 29 to 34 illustrate another exemplary preferred embodiment according to the present invention. FIG. 29 is a rear view illustrating a mount state of an anti-slip device according to a third embodiment of the invention as seen from the inner side of the tire. FIG. 30 is a front view illustrating a mount state of the anti-slip device according to the third embodiment of the invention as seen from the outer side of the tire. FIG. 31 is a left side view illustrating a mount state of the anti-slip device according to the third embodiment of the invention as seen from the left side of the tire. FIG. 32 is a top plan view illustrating a mount state of the anti-slip device according to the third embodiment of the invention as seen from the upper side of the tire. FIG. 33 is an enlarged view illustrating main parts of FIG. 29, and FIG. 34 is an enlarged view illustrating main parts of FIG. 30.

A tire anti-slip device according to the third embodiment of the invention is a combination of two tire anti-slip devices each having the configuration described in Embodiment 1. The belt-shaped anti-slip body 1 mounted to a tire 500 of a vehicle along a circumferential direction has a tread portion 4 formed of a flexible material such as polyurethane elastomer or rubber and provided with a ground portion making contact with the ground on its surface, a plurality of inner link portions 5 formed to protrude from the tread portion 4 to the inner side of the tire 500 in a width direction, a plurality of outer link portions 6 formed to protrude from the tread portion 4 to the outer side of the tire 500 in the width direction, and a tightener 7 for tightening a tightening wire 71 to tightly fit the anti-slip body 1 to the tire 500.

Each of the tighteners 7 of the anti-slip devices has a wire guide member 2 provided with a wire guide portion 21 capable of guiding the tightening wire 71 to the width direction of the tire 500. The wire guide member 2 is configured to maintain its one side face 2a with respect to the circumferential direction of the tire to be close to one end portion 11 of the anti-slip body 1 at all times. Note that one side position of the wire guide member 2 may also be integrated with the anti-slip body 1 (not shown).

The wire guide member 2 includes a tread portion 22 provided with a ground portion making contact with the ground on its surface, an inner link portion 23 formed to protrude from the tread portion 22 to the inner side of the tire in the width direction, and an outer link portion 24 formed to protrude from the tread portion 22 to the outer side of the tire in the width direction. The wire guide portion 21 has wire access holes 21a and 21b provided in positions of the inner link portion 23 and the outer link portion 24, respectively.

When the anti-slip device is mounted to the tire 500, a facing end portion 12 of the anti-slip body 1 is arranged to face the other side face 2b of the wire guide member 2. In addition, the anti-slip body is configured such that a distance between the inner link portion 23 of the wire guide member 2 and the inner link portion 5 of the anti-slip body 1 positioned in the facing end portion 12 and a distance between the outer link portion 24 of the wire guide member 2 and the outer link portion 6 positioned in the facing end portion 12 of the anti-slip body 1 are reduced at the same time when tightening using the tightener 7.

In the wire guide portion 21, curved portions 21c and 21d directed to the other side face 2b of the wire guide member 2 are formed in the positions of the inner link portion 23 and the outer link portion 24, respectively. Therefore, the wire access holes 21a and 21b of the wire guide portion 21 are directed toward the other side face 2b of the wire guide member 2 (directed to the other end portion 12 of the anti-slip body 1 when the anti-slip device is mounted to the tire 500).

Note that, if the directions of the wire access holes 21a and 21b directed to the facing end portion 12 are set within a range of 0° (equal to the circumferential direction) to 45° inclined to the tire radial direction with respect to the tire circumferential direction while the anti-slip body 1 is mounted to the tire 500, it is possible to prevent a frictional resistance of the tightening wire 71 accessing the wire access holes 21a and 21b from excessively increasing.

The inner link portion 23 of the wire guide member 2 is provided with a tightening wire end fixing portion 25 that can fix a position of the end portion of the tightening wire 71 to the inner link portion 23 by holding a large diameter portion 72 formed in the end portion of the tightening wire 71. The tightening wire 71 having the end portion fixed to the inner link portion 23 of the wire guide member 2 sequentially passes through tightening wire holders 51 arranged in the neighboring inner link portions 5 of the anti-slip body 1. The tightening wire 71 passing through the tightening wire holders 51 provided in all of the inner end portions 5 is extracted from the tightening wire holder 51 of the inner link portion 5 positioned in the facing end portion 12 of the anti-slip device body 1.

Further, the tightening wire 71 passes through the wire guide portion 21 by way of the wire access hole 21a provided in the inner link portion 23 of the wire guide member 2 and is extracted from the wire access hole 21b of the outer link portion 24. Then, the tightening wire 71 is connected to a wire winding mechanism 74 disposed between the outer link portion 6a positioned in the facing end portion 12 of the anti-slip body 1 and the outer link portion 6b neighboring to the position of the facing end portion 12. As a result, a tightener can be obtained.

The tightening wire holder 51 disposed in the inner link portion 5 of the anti-slip body 1 is arranged in the same circumferential position as that of the inner link portion 5 when the anti-slip device is mounted to tire. The tightening wire holder 51 includes a concave portion 52 having an internal space larger than a diameter of the tightening wire 71 formed in the inner link portion 5, a U-shaped cover member 53 arranged to cover the concave portion 52, and a pin-shaped member 54 used to fix the cover member 53 to the inner link portion 5. By fixing a hole 55 formed in the inner link portion 5 and holes 56 formed in both ends of the cover member 53 using the pin-shaped member 54, the cover member 53 is connected to the inner link portion 5 not to be easily removed. Note that, as the pin-shaped member 54, a pin-shaped fixture known in the art, such as a grommet (eyelet), a rivet, and a bolt/nut set may be employed. The distance between the plurality of inner link portions 5 is reduced by extracting tightening wire 71 arranged across the plurality of tightening wire holders 51 using the tightener 7 (the tightening wire holders are similar to the tightening wire holders 51 of Embodiment 1 as illustrated in FIG. 7). Note that the tightening wire 71 may be fixed (nipped) to at least a part of the tightening wire holders 51 formed in each inner link portion 5.

A return stopper member 73 is fixed to the tightening wire 71 between the inner link portion 5 positioned in the facing end portion 12 of the anti-slip body and the wire access hole 21a formed in the inner link portion 23 of the wire guide member 2 when the anti-slip device is mounted to the tire 500. As a result, a movement amount of the tightening wire 71 toward the plurality of tightening wire holders 51 is restricted when the tightener 7 is released.

Note that, according to this embodiment, tubular members 57 are provided between the tightening wire holders 51 arranged in each of the inner link portions 5, and the tightening wire 71 passes through the tubular members 57, so that the minimum distance between each of the tightening wire holders 51 is restricted. As a result, it is possible to prevent a variation of the minimum distance between the tightening wire holders 51 when the tightening wire 71 is tightened using the tightener 7. Therefore, it is possible to regularly set the anti-slip body 1 with respect to the tire 500.

Note that, according to this embodiment, the tubular member 57 is arranged movably between the tightening wire holders 51. However, the tubular member 57 may be fixed to the tightening wire holder 51 (not shown). Alternatively, the tubular member 57 may also be omitted (not shown).

Further, the wire winding mechanism 74 internally includes a winder for the tightening wire, a biasing unit for rotating the winder in a winding direction of the tightening wire 71, and a control unit for controlling rotation of the winder. The control unit for controlling rotation of the winder is configured to select one of an extraction state in which the tightening wire 71 can be extracted from the winder, a winding state in which the tightening wire 71 is automatically wound around the winder, and a lock state in which the rotation of the winder is locked (fixed). In addition, the internal structure has a locking mechanism for preventing the rotation of the winder in the extracting direction of the tightening wire 71 in the winding state in which the tightening wire 71 is automatically wound around the winder (the internal structure of the wire winding mechanism 74 is not shown). Note that the wire winding mechanism 74 may be formed using a technique of a wire winding mechanism used in the tire anti-slip device known in the art. In addition, the wire winding mechanism 74 according to the present invention may be configured to manually rotate the winder of the tightening wire (not shown). Further, instead of winding the extracted tightening wire 71 using the wire winding mechanism, the tightening wire 71 may be locked and fixed to locking protrusions (not shown) provided in a plurality of outer link portions.

According to this embodiment, between the wire access hole 21b formed in the outer link portion 24 of the wire guide member 2 and the wire winding mechanism 74, the tightening wire holder 61 is disposed in the outer link portion 6 (6a) of the anti-slip body 1, and the structure of the tightening wire holder 61 includes a concave portion 62 formed as an internal space larger than a diameter of the tightening wire 71, an approximately U-shaped cover member 63 arranged to cover the concave portion 62, and a pin-shaped member 64 for fixing the cover member 63 to the outer link portion 6. By fixing the hole 65 formed in the outer link portion 6 and the holes 66 formed in both ends of the cover member 63 using the pin-shaped member 64, the cover member 63 is connected to the outer link portion 6 not to be easily removed (the tightening wire holder 61 is similar to the tightening wire holder 61 of Embodiment 1 as illustrated in FIG. 9). Note that, as the pin-shaped member 64, a pin-shaped fixture known in the art, such as a grommet (eyelet), a rivet, and a bolt/nut set may be employed. Note that, if a plurality of outer link portions 6 of the anti-slip body are arranged between the wire access hole 23 of the wire guide member 2 and the wire winding mechanism 73, the tightening wire holders 61 are arranged in nearly the same circumference as that of the outer link portion 6 when the anti-slip body 1 is mounted to the tire. However, the tightening wire holder 61 may not necessarily be formed in all of the outer link portions 6 (not shown).

An outer distance restricting wire holder 81 configured to hold an outer distance restricting wire 8 is provided in the outer link portion 6 where the tightening wire holder 61 is not arranged out of the outer link portions 6 of the anti-slip body 1. In addition, large diameter portions 80 are formed in both ends of the outer distance restricting wire 8, so that one end 80a of the outer distance restricting wire 8 is fixed to an outer distance restricting wire end fixing portion 26 formed in the outer link portion 24 of the wire guide member 2, and the other end 80b of the outer distance restricting wire 8 is fixed to the outer distance restricting wire holder 81 arranged in the outer link portion 6b where the other end of the connecting member 75 is fixed.

The outer distance restricting wire 8 is fixed to the outer distance restricting wire holders 81 arranged in the outer link portion 6 and is held in this state. The outer distance restricting wire holders 81 are arranged in approximately the same circumference as that of the outer link portion 6 when the anti-slip body 1 is mounted to the tire. The outer distance restricting wire holder 81 includes a concave portion 82 having an internal space larger than a diameter of the outer distance restricting wire 8 formed in the outer link portion 6, a spacer portion 82b configured to reduce the internal space of the concave portion 82, an approximately U-shaped cover member 83 arranged to cover the concave portion 82 and the spacer portion 82b, and a pin-shaped member 84 for fixing the cover member 83 to the outer link portion 6. By fixing a hole 85 formed in the outer link portion 6 and holes 86 formed in both ends of the cover member 83 using the pin-shaped member 84, the cover member 83 is connected to the outer link portion 6 not to be easily removed (the outer distance restricting wire holder 81 is similar to the outer distance restricting wire holder 81 of Embodiment 1 as illustrated in FIG. 11). Note that, as the pin-shaped member 84, a pin-shaped fixture known in the art, such as a grommet (eyelet), a rivet, and a bolt/nut set may be employed. Note that the outer distance restricting wire 8 may be held movably by setting the internal space of the concave portion 82 of at least a part of the outer distance restricting wire holders 81 to be larger than the diameter of the outer distance restricting wire 8.

Further, tubular members 86 are arranged between the outer distance restricting wire holders 81 formed in each of the outer link portions 6. As the outer distance restricting wire 8 passes through the tubular members 86, the minimum distance between each of the outer distance restricting wire holders 81 is restricted. Therefore, it is possible to prevent a deviation of the fixing position of the distance restricting wire 8 fixed to the outer distance restricting wire holder 81 and regularly set the anti-slip body 1 with respect to the tire 500.

In this embodiment, the tubular member 66 is arranged movably between the outer link portions. Alternatively, the tubular member 66 may be fixed to the outer distance restricting wire holder 81 (not shown), or may also be omitted (not shown).

In this embodiment, as illustrated in FIGS. 9 and 10 of Embodiment 1, the wire winding mechanism 74 is configured such that a connecting member 75 is fixed on a backside using a screw member 79, holes 76 and 77 are formed in one end and the other end of an extension of the connecting member 75 fixed to the backside of the wire winding mechanism 74, the hole 76 of the one end of the extension of the connecting member 75 fixed to the backside of the wire winding mechanism 74 is fixed to the outer link portion 6a using the pin-shaped member 64 when the cover member 63 is fixed using the pin-shaped member 64, and the hole 77 of the other end of the extension of the connecting member 75 fixed to the backside of the wire winding mechanism 74 is fixed to the outer link portion 6b using the pin-shaped member 84 when the cover member 83 is fixed using the pin-shaped member 84. Alternatively, the wire winding mechanism 74 and the connecting member 75 may also be formed integrally.

According to a modification of this embodiment, without using the outer distance restricting wire 8, a ring member connecting hole where an outer distance restricting ring member can be connected may be formed in the outer link portion 24 of the wire guide member 2 and the outer link portion 6 of the anti-slip body 1, so that a distance between each of the outer link portions is restricted by connecting the outer distance restricting ring member to the ring member connecting hole.

The configuration of the wire guide portion 21 according to this embodiment and the sequence of mounting the tire anti-slip device according to this embodiment to the tire are similar to those of Embodiment 1, and they will not be repeatedly described herein.

Embodiment 4

Figure 35:
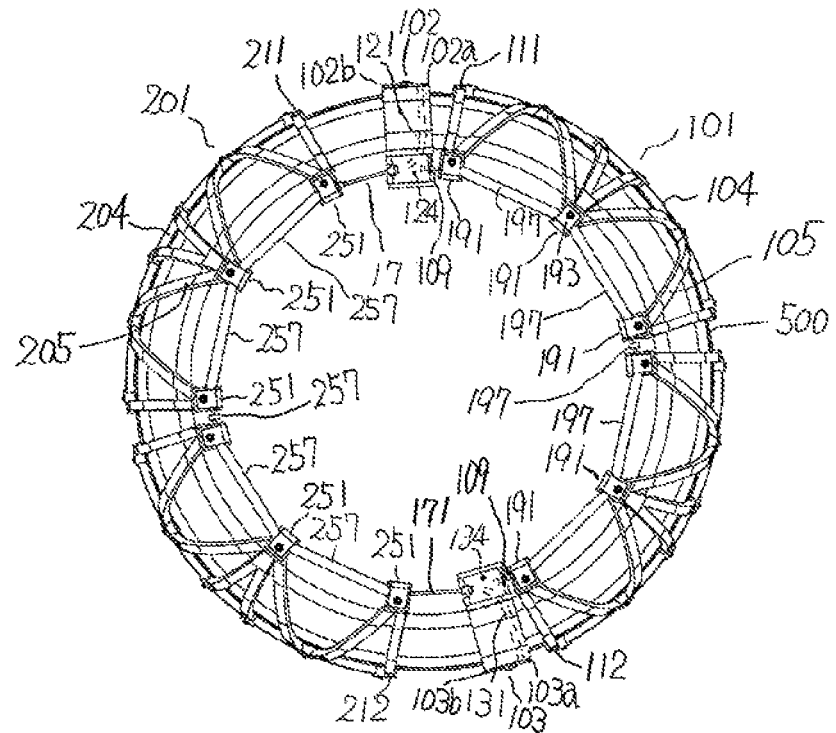
FIG. 35 is a rear view illustrating a mount state of an anti-slip device according to a fourth embodiment of the invention as seen from the inner side of the tire.
Figure 36:
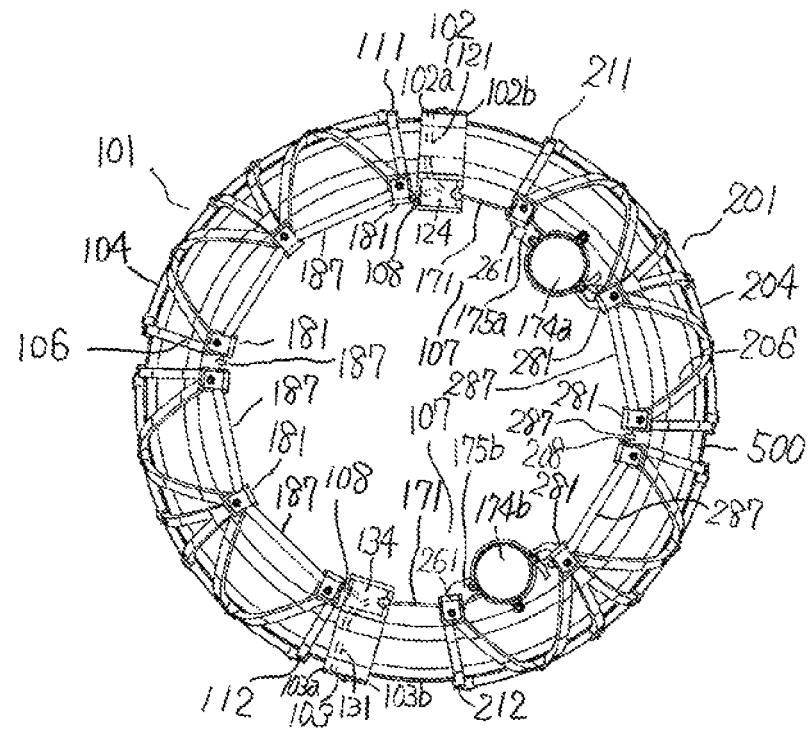
FIG. 36 is a front view illustrating a mount state of the anti-slip device according to the fourth embodiment of the invention as seen from the outer side of the tire.
Figure 37:
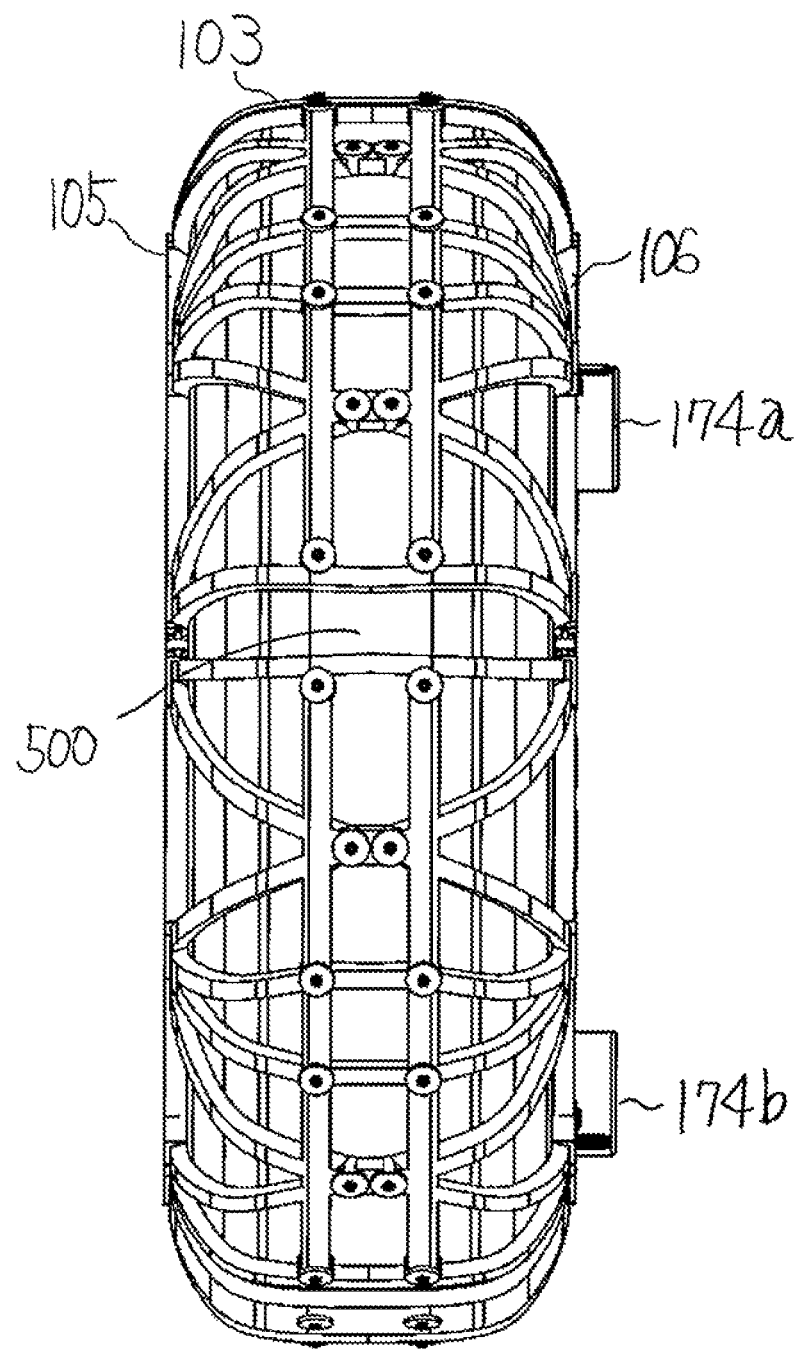
FIG. 37 is a left side view illustrating a mount state of the anti-slip device according to the fourth embodiment of the invention as seen from the left side of the tire.
Figure 38:
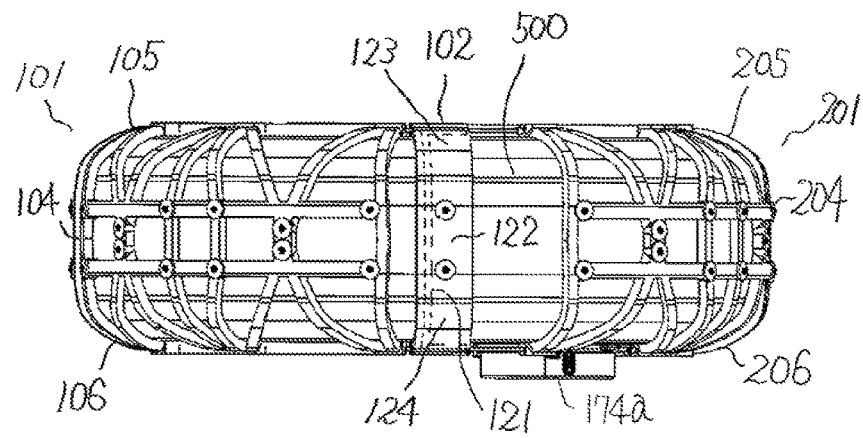
FIG. 38 is a top plan view illustrating a mount state of the anti-slip device according to the fourth embodiment of the invention as seen from the upper side of the tire.
Figure 39:
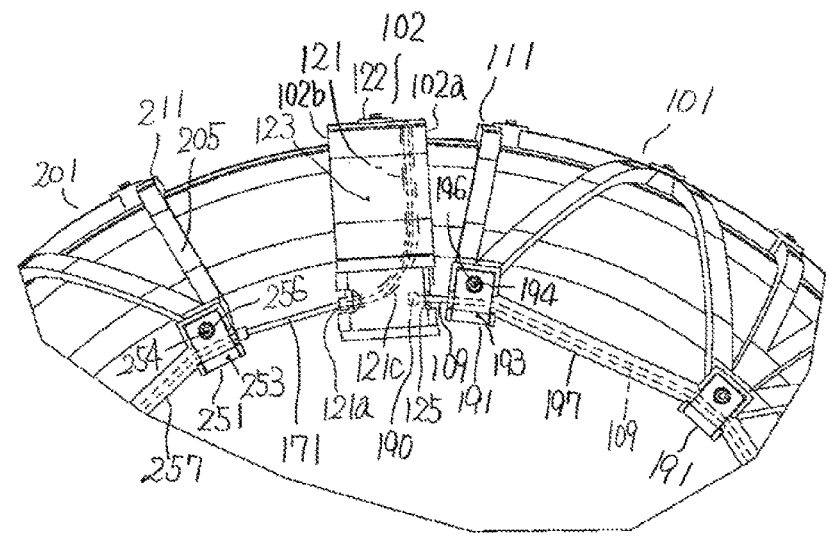
FIG. 39 is an enlarged view illustrating main parts of FIG. 35.
Figure 40:
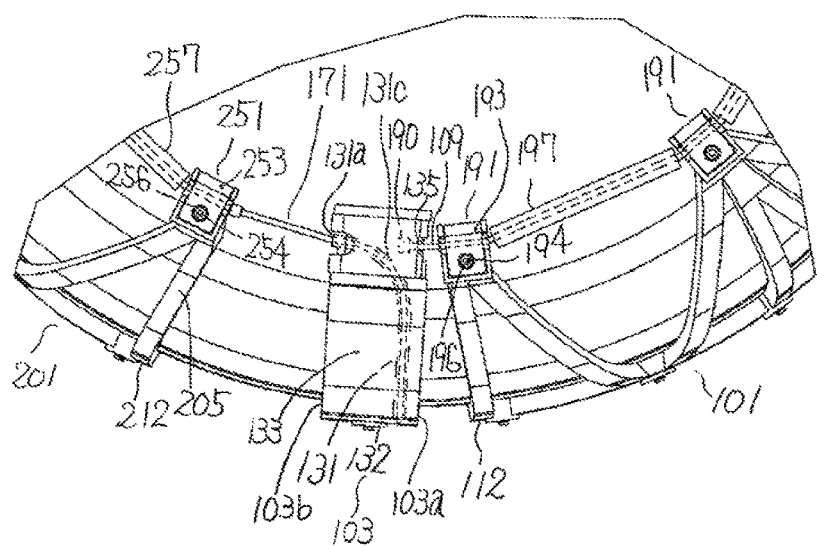
FIG. 40 is an enlarged view illustrating main parts of FIG. 35.
Figure 41:
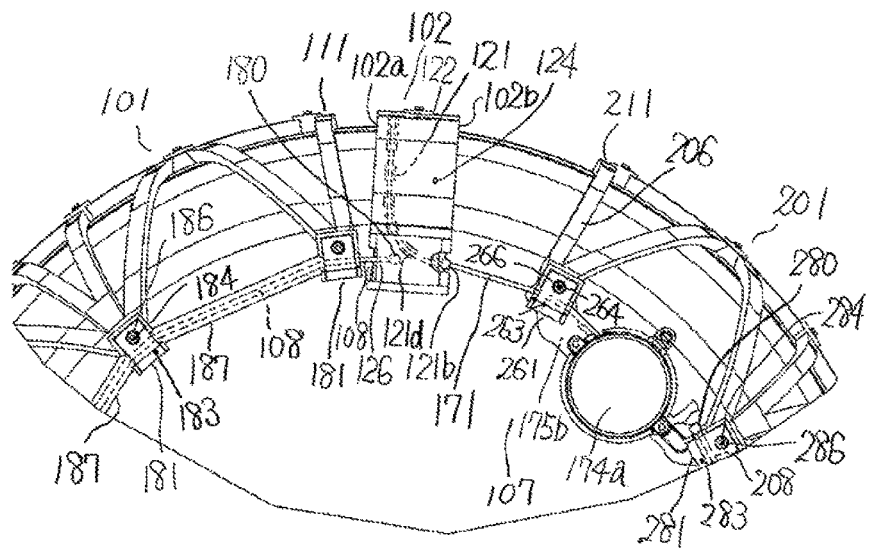
FIG. 41 is an enlarged view illustrating main parts of FIG. 36.
Figure 42:
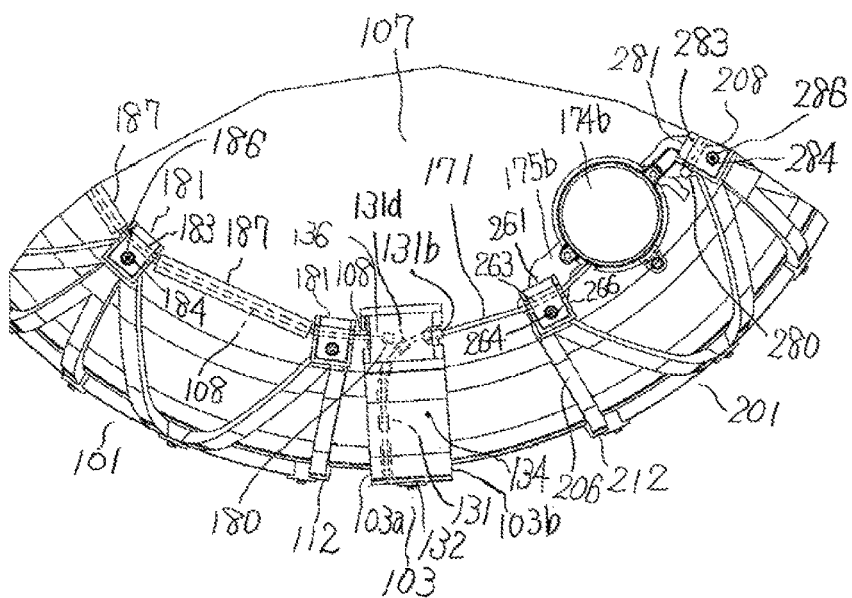
FIG. 42 is an enlarged view illustrating main parts of FIG. 36.
Figure 43:
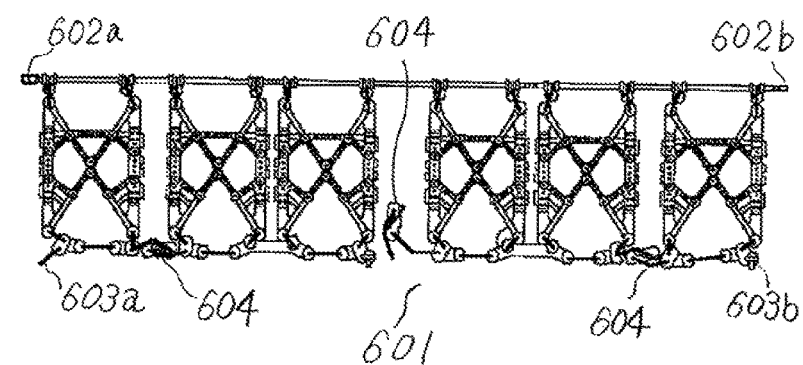
FIG. 43 is a top plan view illustrating an anti-slip device of the prior art.
Figure 44:
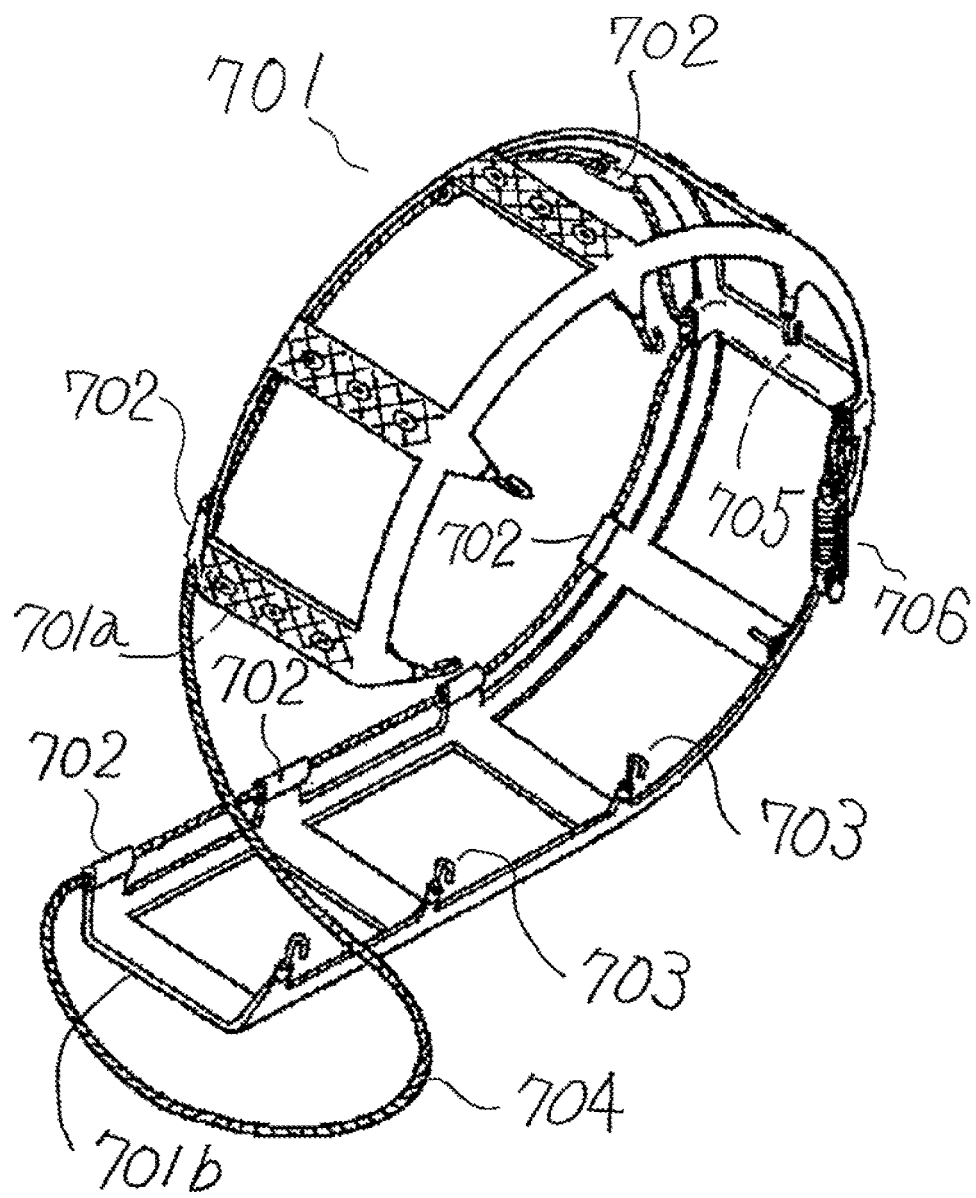
FIG. 44 is a perspective view illustrating an anti-slip device of the prior art.
Figure 45:
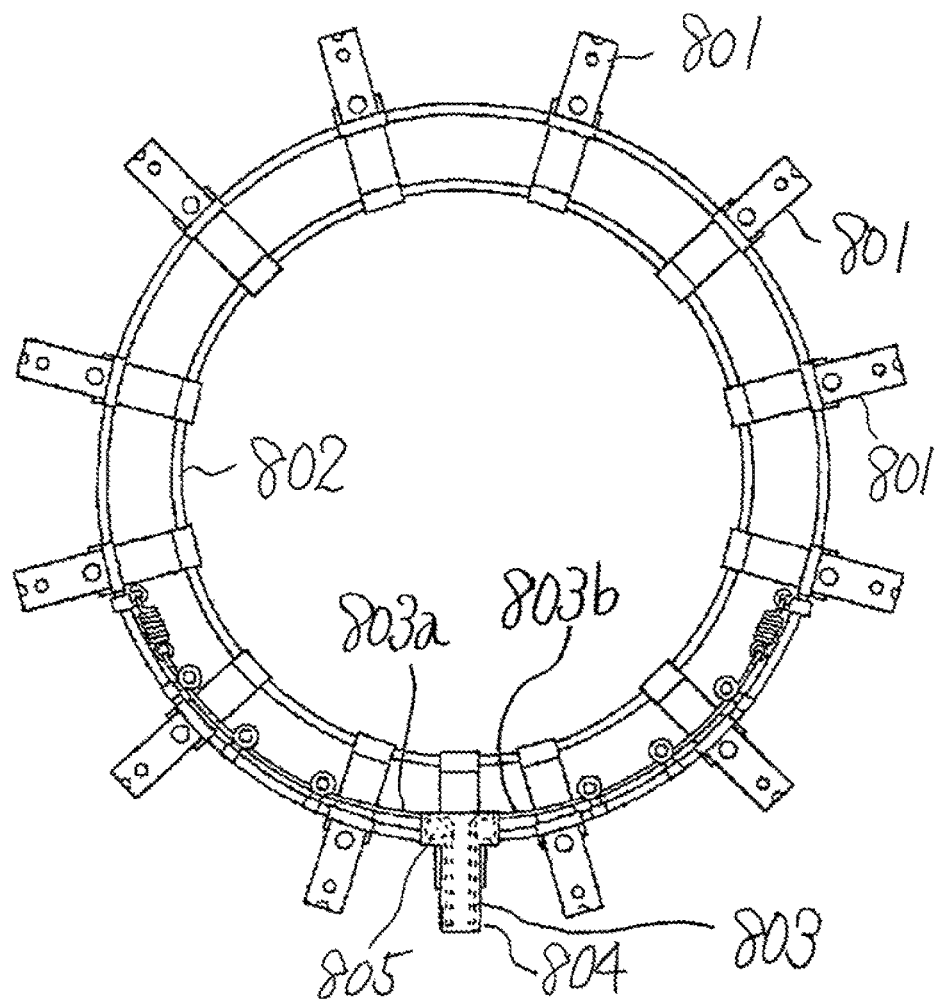
FIG. 45 is a front view illustrating an anti-slip device of the prior art.

FIGS. 35 to 42 illustrate another exemplary preferred embodiment according to the present invention. FIG. 35 is a rear view illustrating a mount state of an anti-slip device according to a fourth embodiment of the invention as seen from the inner side of the tire. FIG. 36 is a front view illustrating a mount state of the anti-slip device according to the fourth embodiment of the invention as seen from the outer side of the tire. FIG. 37 is a left side view illustrating a mount state of the anti-slip device according to the fourth embodiment of the invention as seen from the left side of the tire. FIG. 38 is a top plan view illustrating a mount state of the anti-slip device according to the fourth embodiment of the invention as seen from the upper side of the tire. FIG. 39 is an enlarged view illustrating main parts of FIG. 35, and FIG. 40 is an enlarged view illustrating main parts of FIG. 35. FIG. 41 is an enlarged view illustrating main parts of FIG. 36, and FIG. 42 is an enlarged view illustrating main parts of FIG. 36.

A tire anti-slip device according to the fourth embodiment of the invention has a first anti-slip body 101 and a second anti-slip body 201, each having a belt shape and being mounted to a tire 500 of a vehicle along a circumferential direction. The first and second anti-slip bodies 101 and 201 have tread portions 104 and 204, respectively, formed of a flexible material such as polyurethane elastomer or rubber and provided with a ground portion making contact with the ground on its surface, a plurality of inner link portions 105 and 205, respectively, formed to protrude from the tread portions 104 and 204 to the inner side of the tire in a width direction, a plurality of outer link portions 106 and 206, respectively, formed to protrude from the tread portions 104 and 204 to the outer side of the tire in the width direction, and tighteners 107 for tightening a tightening wire 171 to tightly fit the first and second anti-slip bodies 101 and 201 to the tire.

The tightener 107 of the anti-slip device has a first wire guide member 102 provided with a wire guide portion 121 and a second wire guide member 103 provided with a wire guide portion 131, each capable of guiding the tightening wire 171 to the width direction of the tire. The first wire guide member 102 is disposed in one end portion 111 of the first anti-slip body 101 in the tire circumferential direction, and the second wire guide member 103 is disposed in the other end portion 112 of the first anti-slip body 101 in the tire circumferential direction, such that the one side face 102a of the first wire guide member 102 is maintained to be close to the other end portion 111 of the first anti-slip body 101 at all times, and the one side face 103a of the second wire guide member 103 is maintained to be close to the other end portion 112 of the first anti-slip body 101 at all times. Alternatively, each of one side positions of the first wire guide member 102 and one side of the second wire guide member 103 may be formed integrally with the first anti-slip body 101, so that each of the other side face 102b of the first wire guide member 102 and the other side face 103b of the second wire guide member 103 is formed in the end portion of the first anti-slip body 101 (not shown).

The first wire guide member 102 has a tread portion 122 provided with a ground portion making contact with the ground on its surface, an inner link portion 123 formed to protrude from the tread portion 122 to the inner side of the tire in the width direction, and an outer link portion 124 formed to protrude from the tread portion 122 to the outer side of the tire in the width direction. The wire guide portion 121 has wire access holes 121a and 121b provided in positions of the inner link portion 123 and the outer link portion 124, respectively. Similarly, the second wire guide member 103 has a tread portion 132 provided with a ground portion making contact with the ground on its surface, an inner link portion 133 formed to protrude from the tread portion 132 to the inner side of the tire in the width direction, and an outer link portion 134 formed to protrude from the tread portion 132 to the outer side of the tire in the width direction. The wire guide portion 131 has wire access holes 131a and 131b provided in positions of the inner link portion 133 and the outer link portion 134, respectively.

When the anti-slip device is mounted to the tire 500, one of facing end portion 211 and the other facing end portion 212 of the second anti-slip body 201 are disposed to face the other side face 102b of the first wire guide member 102 and the other side face 103b of the second wire guide member 103, respectively, connected to the first anti-slip body 101. In addition, a distance between the other side face 102b of the first wire guide member 102 connected to the first anti-slip body 101 and the one facing end portion 211 of the second anti-slip body 201 disposed to face the other side face 102b and a distance between the other side face 103b of the second wire guide member 103 connected to the first anti-slip body 101 and the other facing end portion 212 of the second anti-slip body 201 disposed to face the other side face 103b are variable.

A distance between the inner link portion 123 of the first wire guide member 102 and the inner link portion 205 positioned in the one facing end portion 211 of the second anti-slip body 201 and a distance between the outer link portion 124 of the first wire guide member 102 and the outer link portion 206 positioned in the one facing end portion 211 of the second anti-slip body 201 are reduced at the same time when tightening using the tightener 107. In addition, a distance between the inner link portion 133 of the second wire guide member 103 and the inner link portion 205 positioned in the other facing end portion 212 of the second anti-slip body 201 and a distance between the outer link portion 134 of the second wire guide member 103 and the outer link portion 206 positioned in the other facing end portion 212 of the second anti-slip body 201 are reduced at the same time when tightening using the tightener 107.

In the first wire guide portion 121, curved portions 102c and 102d directed to the other side face 102b of the first wire guide member 102 are formed in the positions of the inner link portion 123 and the outer link portion 124, respectively. Therefore, the wire access holes 121a and 121b of the wire guide portion 121 are directed toward the other side face 102b of the first wire guide member 102.

In the second wire guide portion 131, curved portions 103c and 103d directed to the other side face 103b of the second wire guide member 103 are formed in the positions of the inner link portion 133 and the outer link portion 134, respectively. Therefore, the wire access holes 131a and 131b of the wire guide portion 131 are directed toward the other side face 103b of the second wire guide member 103.

Note that, if the directions 120a, 120b, 130a, and 130b of the wire access holes 121a, 121b, 131a, and 131b are set within a range of 0° (equal to the circumferential direction) to 45° inclined to the tire radial direction with respect to a tire circumferential direction 501 while the anti-slip body device is mounted to the tire 500, it is possible to prevent a frictional resistance of the tightening wire 171 accessing the wire access holes 121a, 121b, 131a, and 131b from excessively increasing.

The tightening wire holders 251 are arranged in each of the inner link portions 205 of the second anti-slip body 201. The tightening wire holders 251 are arranged approximately in the same circumferential positions as that of the inner link portions 205 of the second anti-slip body 201 when the anti-slip device is mounted to tire 500. The tightening wire holder 251 includes a concave portion (not shown) having an internal space larger than a diameter of the tightening wire 171, a U-shaped cover member 253 arranged to cover the concave portion, and a pin-shaped member 254 used to fix the cover member 253 to the inner link portion. By fixing a hole formed in the inner link portion 205 and holes 256 formed in both ends of the cover member using the pin-shaped member 254, the cover member 253 is connected to the inner link portion 205 not to be easily removed.

Note that, as the pin-shaped member 254, a pin-shaped fixture known in the art, such as a grommet (eyelet), a rivet, and a bolt/nut set may be employed. The distance between the plurality of inner link portions 205 is reduced by extracting the tightening wire 171 arranged across the plurality of tightening wire holders 251 using the tightener 107. Note that the tightening wire holder 251 is configured similar to the tightening wire holder 51 of Embodiment 1. Note that the tightening wire 171 may be fixed (nipped) to at least a part of the tightening wire holders 251 formed in each inner link portion 205.

The tightening wire 171 passes through the tightening wire holders 251 arranged in the inner link portions 205 of the second anti-slip body 201. One end of the tightening wire 171 is extracted from the tightening wire holder 251 arranged in the inner link portion 205 positioned in the one facing end portion 211 of the second anti-slip body 201. Then, the tightening wire 171 enters the wire access hole 121a formed in the inner link portion 123 of the first wire guide member 102 connected to the first anti-slip body 101, passes through the first wire guide portion 121, and is extracted from the wire access hole 121b formed in the outer link portion 124. Then, the one end of the tightening wire 171 passes through the inside of the tightening wire holder 261 arranged in the outer end portion 206 positioned in the one facing end portion 211 of the second anti-slip body 201 and is connected to the first wire winding mechanism 174a positioned in the outer link portion 206 in the side of the one facing end portion 211 of the second anti-slip body 201. Meanwhile, the other end of the tightening wire 171 is extracted from the tightening wire holder 251 arranged in the inner link portion 205 positioned in the other facing end portion 212 of the second anti-slip body 201 and enters the wire access hole 131*a* formed in the inner link portion 133 of the second wire guide member 103 connected to the first anti-slip body 101. Then, the other end of the tightening wire 171 passes through the second wire guide portion 131, is extracted from the wire access hole 131*b* formed in the outer link portion 134, passes through the inside of the tightening wire holder 261 arranged in the outer end portion 206 positioned in the other facing end portion 212 of the second anti-slip body 201, and is connected to the second wire winding mechanism 174*b* positioned in the outer link portion 206 in the side of the other facing end portion 212 of the second anti-slip body 201. As a result, a tightener is obtained.

Note that the tightening wire holder 261 includes a concave portion (not shown) formed in the outer link portion 206 of the second anti-slip body 201 and provided with an internal space larger than a diameter of the tightening wire 171, a generally U-shaped cover member 263 arranged to cover the concave portion, and a pin-shaped member 264 used to fix the cover member 263 to the outer link portion 206. By fixing a hole formed in the outer link portion 206 and holes 266 formed in both ends of the cover member 263 using the pin-shaped member 264, the cover member 263 is connected to the outer link portion 206 not to be easily removed. Note that the tightening wire holder 261 is configured similar to the tightening wire holder 61 of Embodiment 1. Note that, as the pin-shaped member, a pin-shaped fixture known in the art, such as a grommet (eyelet), a rivet, and a bolt/nut set may be employed.

Note that, according to this embodiment, tubular members 257 are arranged in at least a part of spaces between the tightening wire holders 251 arranged in the inner link portions 205 of the second anti-slip body 201, and the minimum distance between the tightening wire holders 251 of each of the inner link portions 205 is restricted as the tightening wire 171 passes through the tubular members 257. As a result, it is possible to prevent a variation of the minimum distance between the tightening wire holders 251 when the tightening wire 171 is tightened using the tightener 107. Therefore, it is possible to regularly set the second anti-slip body 201 with respect to the tire 500.

Inner distance restricting wire end fixing portions 125 and 135 for fixing end portions of the inner distance restricting wire 109 are formed in the inner link portion 123 of the first wire guide member 102 and the inner link portion 133 of the second wire guide member 103, respectively. By holding large diameter portions 190 formed in both ends of the inner distance restricting wire 109, each end portion of the inner distance restricting wire 109 is fixed to the inner link portion 123 of the first wire guide member 102 and the inner link portion 133 of the second wire guide member 103. Inner distance restricting wire holders 191 capable of holding the inner distance restricting wire 109 are arranged in each of the inner link portions 105 of the first anti-slip body 101, and the inner distance restricting wire 109 is held by the inner distance restricting wire holders 191 arranged in each of the inner link portions 105 of the first anti-slip body 101. Note that the structure of the inner distance restricting wire holder 191 includes a concave portion (not shown) having an internal space larger than a diameter of the inner distance restricting wire 109 formed in the inner link portion 105, a generally U-shaped cover member 193 arranged to cover the concave portion, and a pin-shaped member 194 used to fix the cover member 193 to the inner link portion 105. By fixing the hole formed in the inner link portion 105 and holes 196 formed in both ends of the cover member 193 using the pin-shaped member 194, the cover member 193 is connected to the inner link portion 105 not to be easily removed. Note that the inner distance restricting wire holder 191 is configured similar to the outer distance restricting wire holder 81 of Embodiment 1. Note that, as the pin-shaped member, a pin-shaped fixture known in the art, such as a grommet (eyelet), a rivet, and a bolt/nut set may be employed.

Tubular members 197 are arranged in at least a part of the spaces between the inner distance restricting wire holders 191 arranged in the inner link portions 105 of the first anti-slip body 101, and the minimum distance between the inner distance fixing wire holders 191 of each of the inner link portions 105 is restricted as the inner distance fixing wire 109 passes through the tubular members 197. As a result, it is possible to prevent a variation of the minimum distance between the inner distance fixing wire holders 191 and regularly set the first anti-slip body 101 with respect to the tire 500.

Alternatively, instead of the inner distance restricting wire 109, a ring member connecting hole where an inner distance restricting ring member can be connected may be formed in each of the inner link portion 123 of the first wire guide member 102, the inner link portion 133 of the second wire guide member 103, and the inner link portions 105 of the first anti-slip body 101, so that the distance between the first wire guide member 103, the second wire guide member 103, and the inner link portions 105 of the first anti-slip body 101 is restricted by connecting the inner distance restricting ring member to the ring member connecting hole (not shown). Note that the structures of the inner distance restricting ring member and the ring member connecting hole where the inner distance restricting ring member can be connected are similar to the inner distance restricting ring member 58 and the ring member connecting hole 59 described in Embodiment 2 of the invention.

First outer distance restricting wire end fixing portions 126 and 136 configured to fix the end of the first outer distance restricting wire 108 are formed in the outer link portion 124 of the first wire guide member 102 and the outer link portion 134 of the second wire guide member 103, respectively. As the first outer distance restricting wire end fixing portions 126 and 136 hold the large diameter portions 180 formed in both ends of the first outer distance restricting wire 108, the ends of the first outer distance restricting wire 108 are fixed to the outer end portion 124 of the first wire guide member 102 and the outer link portion 134 of the second wire guide member 103, respectively. First outer distance restricting wire holders 181 configured to hold the first outer distance restricting wire 108 are formed in the outer link portions 106 of the first anti-slip body 101. The first outer distance restricting wire 108 is held in the first outer distance restricting wire holders 181 arranged in each of the outer link portions 106. Note that the first outer distance restricting wire holder 181 includes a concave portion (not shown) having an internal space larger than a diameter of the first outer distance restricting wire 108, a generally U-shaped cover member 183 arranged to cover the concave portion, and a pin-shaped member 184 used to fix the cover member 183 to the outer link portion 106. By fixing a hole formed in the outer link portion 106 and holes 186 formed in both ends of the cover member 183 using the pin-shaped member 184, the cover member 183 is connected to the outer link portion 106 not to be easily removed. Note that the first outer distance restricting wire holder 181 is configured similar to the outer distance restricting wire holder 81 of Embodiment 1. Note that, as the pin-shaped member 184, a pin-shaped fixture known in the art, such as a grommet (eyelet), a rivet, and a bolt/nut set may be employed.

Tubular members 187 are arranged in at least a part of the spaces between the first outer distance restricting wire holders 181 provided in the outer link portions 106 of the first anti-slip body 101. As the first outer distance fixing wire 108 passes through the tubular members 187, the minimum distance between the first outer distance restricting wire holders 181 of the outer link portion 106 is restricted. As a result, it is possible to prevent a variation of the minimum distance between the first outer distance restricting wire holders 181 and regularly set the first anti-slip body 101 with respect to the tire 500.

Alternatively, instead of the first outer distance restricting wire 108, a ring member connecting hole where the first outer distance restricting ring member can be connected may be formed between the outer link portion 124 of the first wire guide member 102, the outer link portion 134 of the second wire guide member 103, and the outer link portion 106 of the first anti-slip body 101, such that the distance between the first wire guide member 102, the second wire guide member 103, and the outer link portions of the first anti-slip body 101 is restricted by connecting the first outer distance restricting ring member to the ring member connecting hole (not shown). Note that the configurations of the first outer distance restricting ring member and the ring member connecting hole where the first outer distance restricting ring member can be connected are similar to those of the outer distance restricting ring member 68 and the ring member connecting hole 69 described in Embodiment 2 of the invention.

Further, the outer link portions 206 of the second anti-slip body 201 are provided with second outer distance restricting wire holders 281 configured to hold the second outer distance restricting wire 208, and the second outer distance restricting wire 208 is held by the second outer distance restricting wire holders 281 arranged in each of the outer link portions 206. Note that the holder of the second outer distance restricting wire 208 includes a concave portion (not shown) having an internal space larger than a diameter of the second outer distance restricting wire 208, a generally U-shaped cover member 283 arranged to cover the concave portion, and a pin-shaped member 284 used to fix the cover member 283 to the outer link portion 206. By fixing the hole formed in the outer link portion 206 and the holes 286 formed in both ends of the cover member 283 using the pin-shaped member 284, the cover member 283 is connected to the outer link portion 206 not to be easily removed. Note that the second outer distance restricting wire holder 281 is configured similar to the outer distance restricting wire holder 81 of Embodiment 1. Note that, as the pin-shaped member 284, a pin-shaped fixture known in the art, such as a grommet (eyelet), a rivet, and a bolt/nut set may be employed.

Further, a connecting member 175a is fixed to the backside of the first wire winding mechanism 174a, such that one end of the connecting member 175a is fixed to the tightening wire holder 261, and the other end of the connecting member 175a is fixed to the second outer distance restricting wire holder 281. Similarly, a connecting member 175b is fixed to the backside of the second wire winding mechanism 174b, such that one end of the connecting member 175b is fixed to the tightening wire holder 261, and the other end of the connecting member 175b is fixed to the second outer distance restricting wire holder 281. Alternatively, the wire winding mechanism 174a and the connecting member 175a may be formed integrally with each other, and the wire winding mechanism 174b and the connecting member 175b may be formed integrally with other.

Large diameter portions 280 are formed in both ends of the second outer distance restricting wire 208 so as to be fixed by the second outer distance restricting wire holder 281 where the connecting members 175a and 175b are fixed. Alternatively, both ends of the second outer distance restricting wire 208 may also be fixed to the connecting members 175a and 175b, respectively (not shown).

Tubular members 287 are arranged in at least a part of the spaces between the second outer distance restricting wire holders 281 arranged in the outer link portions 206 of the second anti-slip body 201. As the second outer distance fixing wire 208 passes through the tubular members 287, the minimum distance between the second outer distance restricting wire holders 281 of each of the outer link portions 206 is restricted. As a result, it is possible to prevent a variation of the minimum distance between the second outer distance restricting wire holders 281 and regularly set the second anti-slip body 201 with respect to the tire 500.

Alternatively, instead of the second outer distance restricting wire 208, a ring member connecting hole where the second outer distance restricting ring member can be connected may be formed between at least a part of the outer link portions 206 of the second anti-slip body 201, such that a distance between each of the outer link portions 206 of the second anti-slip body 201 is restricted by connecting the second outer distance restricting ring member to the ring member connecting hole (not shown). Note that the configurations of the second outer distance restricting ring member and the ring member connecting hole where the second outer distance restricting ring member can be connected are similar to those of the outer distance restricting ring member 68 and the ring member connecting hole 69 described in Embodiment 2 of the invention.

INDUSTRIAL APPLICABILITY

The structure of the present invention may be effectively employed as a tire anti-slip device mounted to a tire in the event of a snowfall or an iced road surface.

REFERENCE SIGNS AND NUMERALS

1: anti-slip body, 2: wire guide member, 2a: one side face, 2b: the other side face, 3, 4: tread portion, 5: inner link portion, 6: outer link portion, 6a: outer link portion, 6b: outer link portion, 6y: outer link portion, 6z: outer link portion, 7: tightener, 8: outer distance restricting wire, 11: one end portion, 12: facing end portion, 13: tightening wire end fixing portion, 21: wire guide portion, 21a: wire access hole, 21b: wire access hole, 21c: curved portion, 21d: curved portion, 22: tread portion, 23: inner link portion, 24: outer link portion, 26: outer distance restricting wire end fixing portion, 29: ring member connecting hole, 51: tightening wire holder, 52: concave portion, 53: cover member, 54: pin-shaped member, 55: hole, 56: hole, 57: tubular member, 58: inner distance restricting ring member, 59: ring member connecting hole, 60: outer arm portion, 61: tightening wire holder, 62: concave portion, 63: cover member, 64: pin-shaped member, 65: hole, 66: hole, 67: tubular member, 68: outer distance restricting ring member, 69: ring member connecting hole, 71: tightening wire, 72: large diameter portion, 73: return stopper member, 74: wire winding mechanism, 75: connecting member, 76: hole, 77: hole, 78: pin-shaped member, 79: screw member, 80: large diameter portion, 80*a*: one end, 80*b*: the other end, 81: outer distance restricting wire holder, 82: concave portion, 82*b*: spacer portion, 83: cover member, 84: pin-shaped member, 85: hole, 86: hole, 86: tubular member, 101: first anti-slip body, 102: first wire guide member, 102*a*: one side face, 102*b*: the other side face, 103: second wire guide member, 103*a*: one side face, 103*b*: the other side face, 104: tread portion, 105: inner link portion, 106: outer link portion, 107: tightener, 108: first outer distance restricting wire, 109: inner distance restricting wire, 111: one end portion, 112: the other end portion, 120*a*: direction, 120*b*: direction, 121: wire guide portion, 121*a*: wire access hole, 121*b*: wire access hole, 122: tread portion, 123: inner link portion, 124: outer link portion, 125: inner distance restricting wire end fixing portion, 126: second outer distance restricting wire end fixing portion, 130*a*: direction, 130*b*: direction, 131: wire guide portion, 131*a*: wire access hole, 131*b*: wire access hole, 132: tread portion, 133: inner link portion, 134: outer link portion, 135: inner distance restricting wire end fixing portion, 136: second outer distance restricting wire end fixing portion, 171: tightening wire, 174*a*: first wire winding mechanism, 174*b*: second wire winding mechanism, 175*a*: connecting member, 175*b*: connecting member, 180: large diameter portion, 181: inner distance restricting wire holder, 183: cover member, 184: pin-shaped member, 186: hole, 187: tubular member, 190: large diameter portion, 191: inner distance restricting wire holder, 193: cover member, 194: pin-shaped member, 196: hole, 197: tubular member, 201: second anti-slip body, 204: tread portion, 205: inner link portion, 206: outer link portion, 208: second outer distance restricting wire, 211: one of facing end portions, 212: the other facing end portion, 251: tightening wire holder, 253: cover member, 254: pin-shaped member, 256: hole, 257: tubular member, 261: tightening wire holder, 263: cover member, 264: pin-shaped member, 266: hole, 267: tubular member, 280: large diameter portion, 281: second outer distance restricting wire holder, 283: cover member, 284: pin-shaped member, 186: hole, 287: tubular member, 500: tire

The invention claimed is:

1. A tire anti-slip device comprising:
   an anti-slip body shaped in at least a set of belts and mounted along a tire circumferential direction,
   the anti-slip body having
      a tread portion provided with a ground portion making contact with the ground on its surface,
      a plurality of inner link portions formed to protrude from the tread portion of the anti-slip body to an inner side of a tire in a width direction, and
      a plurality of outer link portions formed to protrude from the tread portion of the anti-slip body to an outer side of the tire in the width direction; and
   a tightener for tightening at least a tightening wire to tightly fit the anti-slip body to the tire,
   wherein the tightener of the anti-slip device has a wire guide member provided with a wire guide portion capable of guiding the tightening wire to the width direction of the tire, so that one side face of the wire guide member in the tire circumferential direction is maintained to be close to an end of the anti-slip body, or a portion corresponding to one side position of the wire guide member in the tire circumferential direction is formed integrally with the anti-slip body,
   the wire guide member has
      a tread portion provided with a ground portion making contact with the ground on its surface,
      an inner link portion formed to protrude from the tread portion of the wire guide member to the inner side of the tire in the width direction, and
      an outer link portion formed to protrude from the tread portion of the wire guide member to the outer side of the tire in the width direction,
   the wire guide portion has wire access holes positioned in each of inner and outer link portions,
   a facing end portion of the anti-slip body is arranged to face the other side face of the wire guide member when the anti-slip device is mounted to the tire, and
   both of a distance between the inner link portion of the wire guide member and inner link portion positioned in the facing end portion of the anti-slip body and a distance between the outer link portion of the wire guide member and the outer link portion positioned in the facing end portion of the anti-slip body are reduced in a tightening operation of the tightener.

2. The tire anti-slip device according to claim 1, wherein the wire guide portion is provided with curved portions directed toward the other side face of the wire guide member in positions of an inner link portion and outer link portions, so that the wire access holes of the wire guide portion are directed to the other side face of the wire guide member.

3. The tire anti-slip device according to claim 1, wherein the inner link portion of the anti-slip body or the wire guide member is provided with a tightening wire end fixing portion for fixing an end of the tightening wire, and
   the tightener is configured such that
      the tightening wire having the end fixed to the tightening wire end fixing portion passes through tightening wire holders arranged in the inner link portion of the anti-slip body and is extracted from the tightening wire holder arranged in the inner link portion positioned in the facing end portion of the anti-slip body,
      further, the tightening wire passes through the wire guide portion by way of the wire access hole provided in the inner link portion of the wire guide member and is extracted from the wire access hole of the outer link portion of the wire guide member, and
   the wire winding mechanism is connected to the outer link portion of the anti-slip body or the wire guide member.

4. The tire anti-slip device according to claim 3, wherein the tightening wire is held by the tightening wire holders arranged in each of the inner link portions of the anti-slip body, and
   a distance between the plurality of inner link portions of the anti-slip body is reduced by extracting the tightening wire arranged across the plurality of inner link portions using the tightener.

5. The tire anti-slip device according to claim 3, wherein a return stopper member for restricting movement of the tightening wire in a return direction to the inner side of the inner link portion of the anti-slip body is fixed to the tightening wire between the inner link portion of the wire guide member and the facing end portion of the inner link portion of the anti-slip body.

6. The tire anti-slip device according to claim 3, wherein tubular members are arranged between the tightening wire holders formed in each of an inner link portion of the anti-slip body, and a minimum distance between the tightening wire holders of each of the inner link portions is restricted as the tightening wire passes through the tubular members.

7. The tire anti-slip device according to claim 3, wherein an inner distance restricting wire holder configured to hold an inner distance restricting wire is arranged in at least a part of inner link portions of the anti-slip body, and
the inner distance restricting wire is held by the inner distance restricting wire holders arranged in each inner link portion of the anti-slip body.

8. The tire anti-slip device according to claim 3, wherein tubular members are arranged between the inner distance restricting wire holders formed in the inner link portions of the anti-slip body, and a minimum distance between the inner distance restricting wire holders of each of the inner link portions is restricted as the inner distance restricting wire passes through the tubular members.

9. The tire anti-slip device according to claim 3, wherein a ring member connecting hole where an inner distance restricting ring member can be connected is formed between the inner link portion of the wire guide member and/or at least a part of the inner link portions of the anti-slip body, and
a distance between the inner link portion of the wire guide member and/or at least a part of inner link portions of the anti-slip body is restricted as the inner distance restricting ring member is connected to the ring member connecting hole.

10. The tire anti-slip device according to claim 3, wherein the wire winding mechanism is disposed between the outer link portions in any position of the outer link portions of the anti-slip body or the outer link portion of the wire guide member.

11. The tire anti-slip device according to claim 10, wherein the wire winding mechanism is disposed between the outer link portion positioned in the facing end portion of the anti-slip body and the outer link portion neighboring to the position of the facing end portion of the anti-slip body.

12. The tire anti-slip device according to claim 10, wherein the wire winding mechanism is disposed between the outer link portion positioned in the one end portion of the anti-slip body and the outer link portion neighboring to the position of the one end portion of the anti-slip body.

13. The tire anti-slip device according to claim 10, wherein the wire winding mechanism has a connecting member, and at least one end of the connecting member is fixed to the outer link portions of the anti-slip body or the outer link portion of the wire guide member.

14. The tire anti-slip device according to claim 10, wherein the tightening wire holder is arranged in at least one of the outer link portions of the anti-slip body between the wire access hole formed in the outer link portion of the wire guide member and the wire winding mechanism.

15. The tire anti-slip device according to claim 3, wherein an outer distance restricting wire holder configured to hold an outer distance restricting wire is arranged in at least a part of outer link portions of the anti-slip body, and
the outer distance restricting wire is held by the outer distance restricting wire holders arranged in each outer link portion of the anti-slip body.

16. The tire anti-slip device according to claim 15, wherein one end of the outer distance restricting wire is fixed to the outer link portion of the wire guide member.

17. The tire anti-slip device according to claim 15, wherein the other end of the outer distance restricting wire is fixed to an outer link portion of the anti-slip body where one end or the other end of the connecting member of the wire winding mechanism is fixed.

18. The tire anti-slip device according to claim 15, wherein the other end of the outer distance restricting wire is fixed to the connecting member of the wire winding mechanism.

19. The tire anti-slip device according to claim 15, wherein tubular members are arranged in at least a part of spaces between the outer distance restricting wire holders arranged in the outer link portions of the anti-slip body, and
a minimum distance between the outer distance restricting wire holders of each outer link portion of the anti-slip body is restricted as the outer distance fixing wire passes through the tubular members.

20. The tire anti-slip device according to claim 3, wherein a ring member connecting hole where an outer distance restricting ring member can be connected is formed between the outer link portion of the wire guide member and/or at least a part of the outer link portions of the anti-slip body, and
a distance between the outer link portion of the wire guide member and/or at least a part of outer link portions of the anti-slip body is restricted by connecting the outer distance restricting ring member to the ring member connecting hole.

21. The tire anti-slip device according to claim 1, wherein a tightening wire end fixing portion configured to fix an end of the tightening wire is formed in an inner link portion positioned in the facing end portion of the anti-slip body, and
the tightener is configured such that the tightening wire having the end fixed to the tightening wire end fixing portion passes through the wire guide portion by way of the wire access hole provided in the inner link portion of the wire guide member, is extracted from the wire access hole of the outer link portion of the wire guide member, and is connected to the wire winding mechanism arranged in a position of the outer link portion of the anti-slip body or the wire guide member.

22. The tire anti-slip device according to claim 1, the anti-slip body includes a first anti-slip body and a second anti-slip body,
one end portion of the first anti-slip body in the tire circumferential direction is provided with a first wire guide member,
the other end portion of the first anti-slip body in the tire circumferential direction is provided with a second wire guide member,
one side face of the first wire guide member and one side face of the second wire guide member are maintained to be close to an end of the first anti-slip body at all time, or a portion corresponding to one side position of the first wire guide member and a portion corresponding to one side position of the second wire guide member are formed integrally with the first anti-slip body,
one of the facing end portions and the other facing end portion of the second anti-slip body are arranged in positions of the first anti-slip body facing the other side face of the first wire guide member and the other side face of the second wire guide member, respectively, when the anti-slip device is mounted to the tire,
at least one of a distance between the other side face of the first wire guide member of the first anti-slip body and the one facing end portion of the second anti-slip body and a distance between the other facing end portions of the second anti-slip body arranged to face the other side face of the second wire guide member of the first anti-slip body is variable, each of the inner link portions of the second anti-slip body is provided with the tightening wire holder, and the tightener is configured such that the tightening wire passes through the tightening wire holders arranged in the inner link portions of the second anti-slip body, one end of the tightening wire is extracted from the tightening wire holder disposed in the inner link portion of the one facing end portion of the second anti-slip body, enters the wire access hole of the inner link portion of the first wire guide member of the first anti-slip body, is extracted from the wire access hole of the outer link portion through the wire guide portion, passes through the inside of the tightening wire holder disposed in an outer end portion positioned in one of the facing end portions of the second anti-slip body arranged to face, and is connected to the first wire winding mechanism arranged in a position of the outer link portion of the second anti-slip body, and the other end of the tightening wire is extracted from the tightening wire holder disposed in the inner link portion of the other facing end portion of the second anti-slip body, enters the wire access hole of the inner link portion of the second wire guide member of the first anti-slip body, passes through the wire guide portion to be extracted from the wire access hole of the outer link portion, passes through the inside of the tightening wire holder disposed in the outer end portion positioned in the other facing end portion of the second anti-slip body arranged to face, and is connected to the second wire winding mechanism arranged in a position of the outer link portion of the second anti-slip body.

23. The tire anti-slip device according to claim 22, wherein tubular members are arranged in at least a part of spaces between the tightening wire holders arranged in the inner link portions of the second anti-slip body, and a minimum distance between the tightening wire holders of each inner link portion of the second anti-slip body is restricted as the tightening wire passes through the tubular members.

24. The tire anti-slip device according to claim 22, wherein an inner distance restricting wire end fixing portion configured to fix an end of the inner distance restricting wire is formed in each of the inner link portions of the first and second wire guide members, each of the inner link portions of the first anti-slip body is provided with an inner distance restricting wire holder configured to hold the inner distance restricting wire, and the inner distance restricting wire is held by the inner distance restricting wire holders formed in each of inner link portions of the first anti-slip body.

25. The tire anti-slip device according to claim 24, wherein tubular members are arranged in at least a part of spaces between the inner distance restricting wire holders arranged in the inner link portions of the first anti-slip body, and a minimum distance between the inner distance restricting wire holders of each inner link portion of the first anti-slip body is restricted as the inner distance fixing wire passes through the tubular members.

26. The tire anti-slip device according to claim 22, wherein a ring member connecting hole where an inner distance restricting ring member can be connected is formed between the inner link portion of the first wire guide member, and/or the inner link portion of the second wire guide member, and/or at least a part of the inner link portions of the first anti-slip body, and a distance between the first wire guide member, and/or the second wire guide member, and/or at least a part of the inner link portions of the first anti-slip body is restricted as the inner distance restricting ring member is connected to the ring member connecting hole.

27. The tire anti-slip device according to claim 22, wherein each of the outer link portions of the first and second wire guide members is provided with a first outer distance restricting wire end fixing portion configured to fix an end of the first outer distance restricting wire, each of the outer link portions of the first anti-slip body is provided with a first outer distance restricting wire holder configured to hold the first outer distance restricting wire, and the first outer distance restricting wire is held by the first outer distance restricting wire holders arranged in each outer link portion of the first anti-slip body.

28. The tire anti-slip device according to claim 27, wherein tubular members are arranged in at least a part of spaces between the first outer distance restricting wire holders arranged in the outer link portions of the first anti-slip body, and a minimum distance between the first outer distance restricting wire holders of each outer link portion of the first anti-slip body is restricted as the first outer distance fixing wire passes through the tubular members.

29. The tire anti-slip device according to claim 22, wherein a ring member connecting hole where a first outer distance restricting ring member can be connected is formed between the outer link portion of the first wire guide member, and/or the outer link portion of the second wire guide member, and/or at least a part of the outer link portions of the first anti-slip body, and a distance between the first wire guide member, and/or the second wire guide member, and/or at least a part of the outer link portions of the first anti-slip body is restricted as the first outer distance restricting ring member is connected to the ring member connecting hole.

30. The tire anti-slip device according to claim 22, wherein at least a part of outer link portions of the second anti-slip body are provided with second outer distance restricting wire holders configured to hold the second outer distance restricting wire, and the second outer distance restricting wire is held by the second outer distance restricting wire holder arranged in each of the outer link portions of the second anti-slip body.

31. The tire anti-slip device according to claim 30, wherein one end of the second outer distance restricting wire is fixed to a connecting member of the first wire winding mechanism, and the other end of the second outer distance restricting wire is fixed to a connecting member of the second wire winding mechanism.

32. The tire anti-slip device according to claim 30, wherein one end of the second outer distance restricting wire is fixed to the outer link portion where the connecting member of the first wire winding mechanism is fixed, and the other end of the second outer distance restricting wire is fixed to the outer link portion where the connecting member of the second wire winding mechanism is fixed.

33. The tire anti-slip device according to claim 30, wherein tubular members are arranged in at least a part of spaces between the second outer distance restricting wire holders arranged in the outer link portions of the second anti-slip body, and
- a minimum distance between the second outer distance restricting wire holders of each of the outer link portions of the second anti-slip body is restricted as the second outer distance fixing wire passes through the tubular members.

34. The tire anti-slip device according to claim 22, wherein a ring member connecting hole where a second outer distance restricting ring member can be connected is formed between at least a part of the outer link portions of the second anti-slip body, and
- a distance between each of outer link portions of the second anti-slip body is restricted as the second outer distance restricting ring member is connected to the ring member connecting hole.

35. The tire anti-slip device according to claim 1, wherein the wire guide portion is a hole provided in the wire guide member.

36. The tire anti-slip device according to claim 35, wherein the hole provided in the wire guide member is formed by a tubular wire holding member insert-molded to the wire guide member.

37. The tire anti-slip device according to claim 35, wherein the hole provided in the wire guide member is formed by a concave portion formed in the wire guide member and a tubular wire holding member arranged inside the concave portion.

38. The tire anti-slip device according to claim 1, wherein the wire guide portion has a concave portion formed in the wire guide member, and a latch portion capable of at least partially blocking the concave portion to prevent removal of the wire.

39. The tire anti-slip device according to claim 1, wherein the wire guide member is formed only by a tubular wire guide portion.

40. The tire anti-slip device according to claim 1, wherein, assuming that a diameter of the tightening wire is set to "A mm," a radius of curvature of the curved portion formed in each of the wire guide portions is set to "$3 A^2$ mm" or larger.

* * * * *